(12) United States Patent
Kang et al.

(10) Patent No.: US 9,807,817 B2
(45) Date of Patent: Oct. 31, 2017

(54) METHOD AND APPARATUS OF LINK ADAPTATION IN WIRELESS LOCAL AREA NETWORK

(71) Applicant: LG ELECTRONICS INC., Seoul (KR)

(72) Inventors: Byeong Woo Kang, Anyang-si (KR); Ill Soo Sohn, Anyang-si (KR); Dae Won Lee, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/138,700

(22) Filed: Apr. 26, 2016

(65) Prior Publication Data

US 2016/0242233 A1 Aug. 18, 2016

Related U.S. Application Data

(63) Continuation of application No. 13/991,158, filed as application No. PCT/KR2011/009278 on Dec. 1, 2011, now Pat. No. 9,350,428.

(Continued)

(51) Int. Cl.
*H04B 17/40* (2015.01)
*H04W 84/12* (2009.01)
(Continued)

(52) U.S. Cl.
CPC .......... *H04W 84/12* (2013.01); *H04B 7/0452* (2013.01); *H04L 1/0003* (2013.01);
(Continued)

(58) Field of Classification Search
None
See application file for complete search history.

(56) References Cited

U.S. PATENT DOCUMENTS

2006/0203855 A1* 9/2006 Senta ............... H04L 1/1678
370/519
2006/0248429 A1* 11/2006 Grandhi ............ H04L 1/1664
714/749

(Continued)

OTHER PUBLICATIONS

Tan, et al., "Link Adaptation Based on Adaptive Modulation and Coding for Multiple-Antenna OFDM System," IEEE Journal on Selected Areas in Communications, vol. 26, No. 8, Oct. 2008, pp. 1599-1606.

(Continued)

*Primary Examiner* — Fan Ng
(74) *Attorney, Agent, or Firm* — Lee Hong Degerman Kang Waimey

(57) ABSTRACT

A method of link adaptation performed by an access point supporting multi user (MU) multiple input multiple output (MIMO) in wireless local area network system is provided. The method includes transmitting, to a first station, a physical layer convergence procedure (PLCP) protocol data unit (PPDU) containing a modulation and coding scheme (MCS) request (MRQ) and receiving, from the first station, a MCS feedback (MFB) in response to the MRQ, wherein the first station is one of destination stations of MU-MIMO transmission performed by the access point, and the MFB includes a recommended MCS value computed, by the first station, on the assumption that the first station, as a member of the destination stations, receives data transmitted over at least one spatial stream allocated to the first station in MU-MIMO transmission.

14 Claims, 34 Drawing Sheets

Related U.S. Application Data

(60) Provisional application No. 61/418,418, filed on Dec. 1, 2010, provisional application No. 61/418,873, filed on Dec. 2, 2010, provisional application No. 61/427,212, filed on Dec. 27, 2010, provisional application No. 61/438,263, filed on Feb. 1, 2011.

(51) Int. Cl.
 *H04B 7/0452* (2017.01)
 *H04L 1/00* (2006.01)
 *H04L 1/16* (2006.01)

(52) U.S. Cl.
 CPC ......... *H04L 1/0009* (2013.01); *H04L 1/0031* (2013.01); *H04L 1/1685* (2013.01)

(56) References Cited

U.S. PATENT DOCUMENTS

| | | |
|---|---|---|
| 2006/0268886 A1 | 11/2006 | Sammour |
| 2006/0285526 A1 | 12/2006 | Jang et al. |
| 2007/0011554 A1 | 1/2007 | Trainin et al. |
| 2007/0129018 A1* | 6/2007 | Trainin ................ H04L 1/0026 455/69 |
| 2007/0298742 A1 | 12/2007 | Ketchum et al. |
| 2008/0181157 A1* | 7/2008 | Aoki ................ H04W 52/0216 370/311 |
| 2009/0005091 A1 | 1/2009 | Takahashi |
| 2009/0010241 A1 | 1/2009 | Uchida et al. |
| 2010/0014500 A1 | 1/2010 | Lee et al. |
| 2010/0080173 A1 | 4/2010 | Takagi |
| 2010/0091675 A1 | 4/2010 | Sawai |
| 2010/0103920 A1 | 4/2010 | Damnjanovic et al. |
| 2010/0309834 A1* | 12/2010 | Fischer ................ H04B 7/0452 370/312 |
| 2011/0072285 A1 | 3/2011 | Fischer et al. |
| 2011/0305176 A1 | 12/2011 | Wentink |
| 2012/0063408 A1 | 3/2012 | Chun et al. |
| 2012/0063439 A1 | 3/2012 | Seok |
| 2012/0213308 A1 | 8/2012 | Merlin et al. |
| 2013/0286959 A1* | 10/2013 | Lou ....................... H04W 72/04 370/329 |

OTHER PUBLICATIONS

Motorola, "Effect of Subspace Information Accuracy on MU-MIMO," 3GPP TSG RAN1 #59bis, R1-100191, Jan. 2009, 9 pages.
PCT International Application No. PCT/KR2011/009278, International Search Report dated May 30, 2012, 2 pages.

* cited by examiner

[Fig. 1]
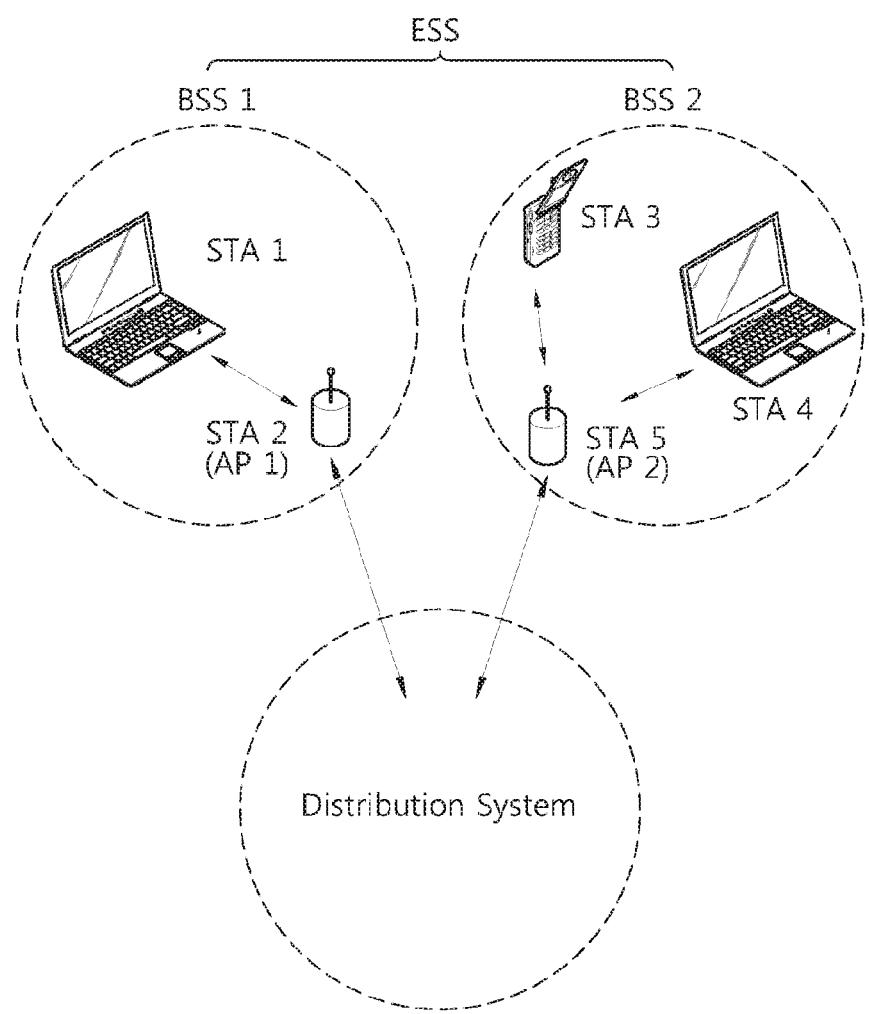

[Fig. 2]
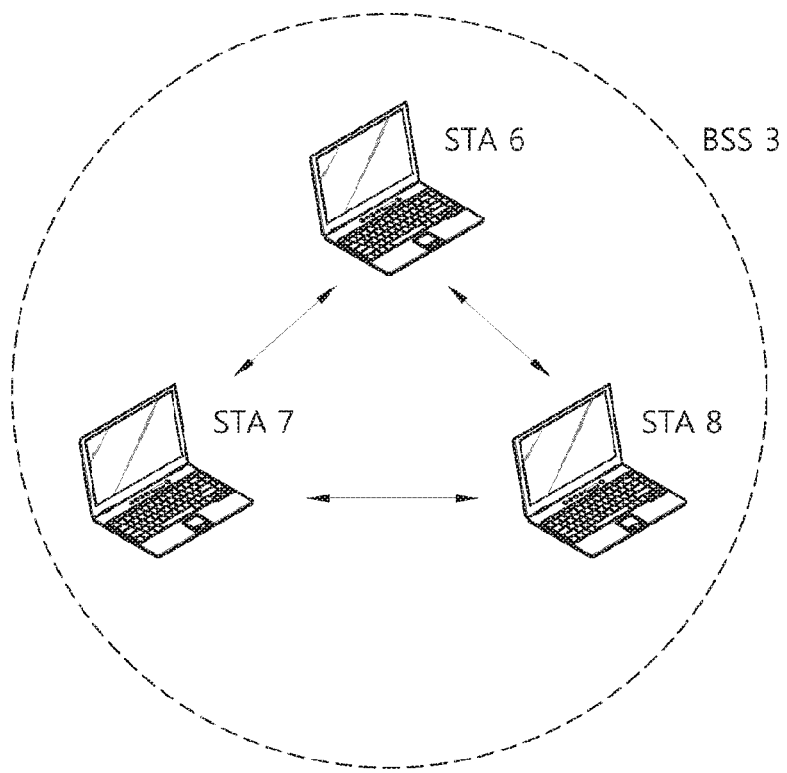
[Fig. 3]
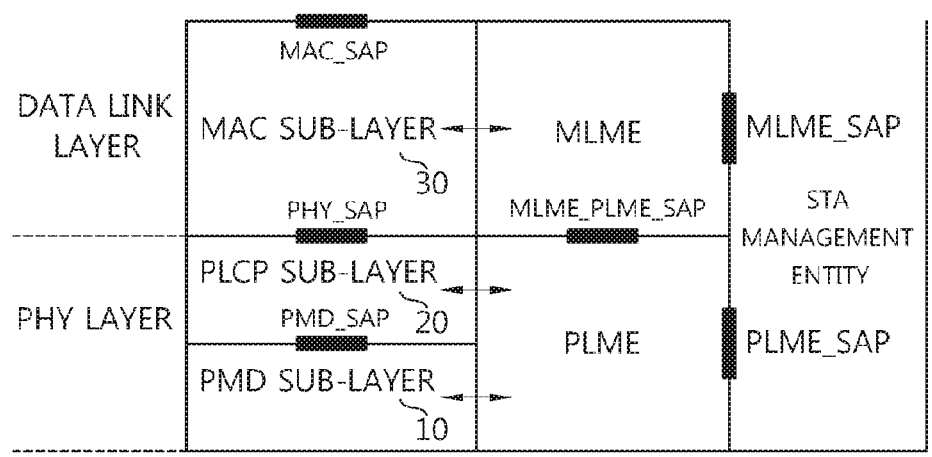

[Fig. 4]
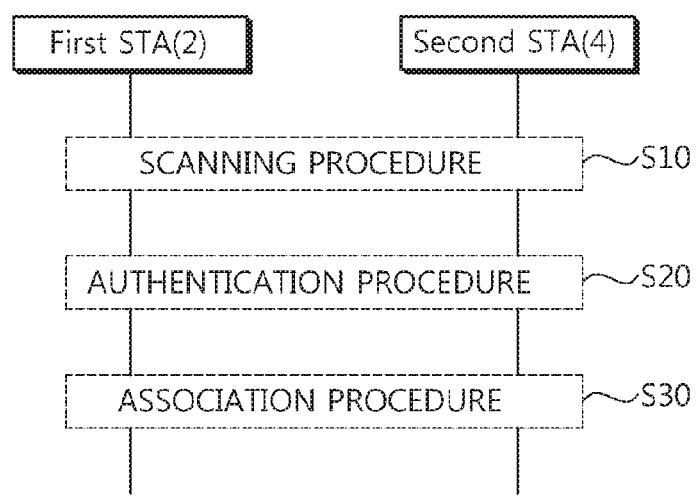

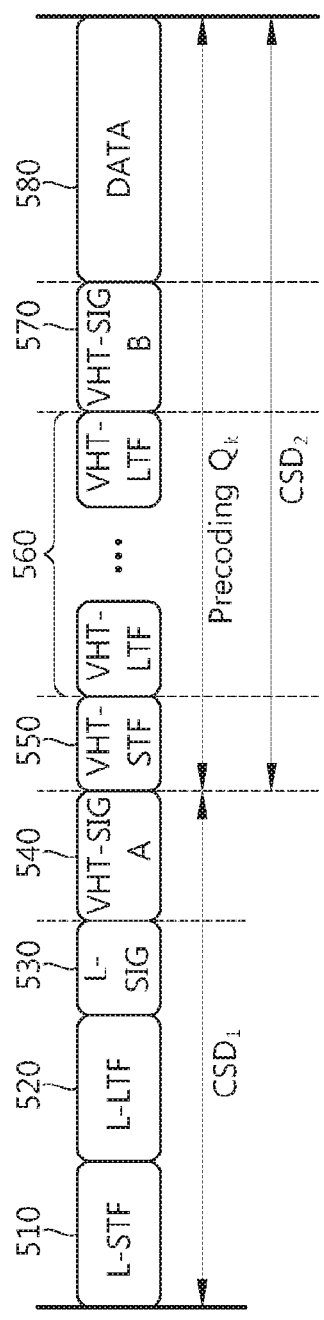

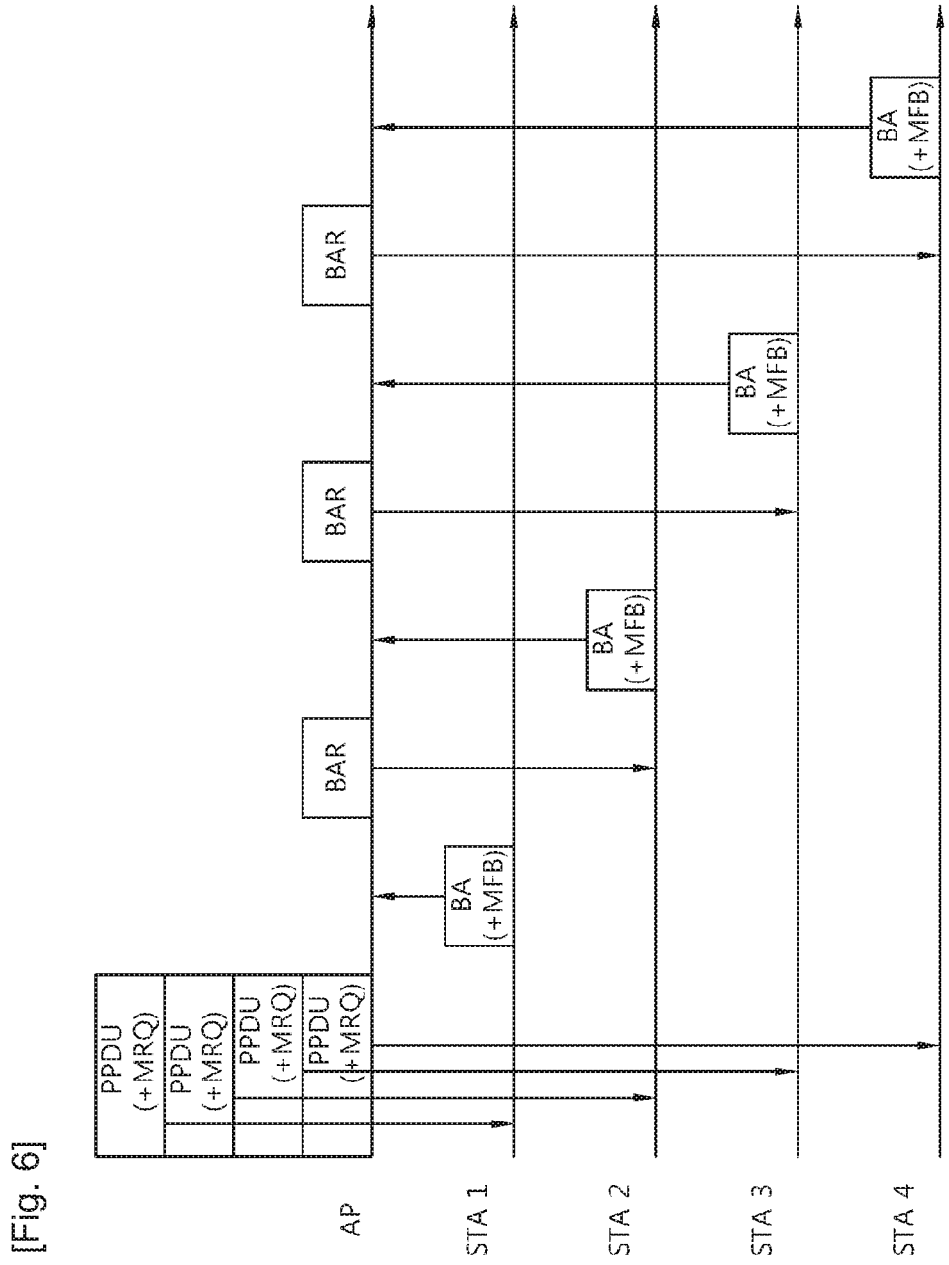

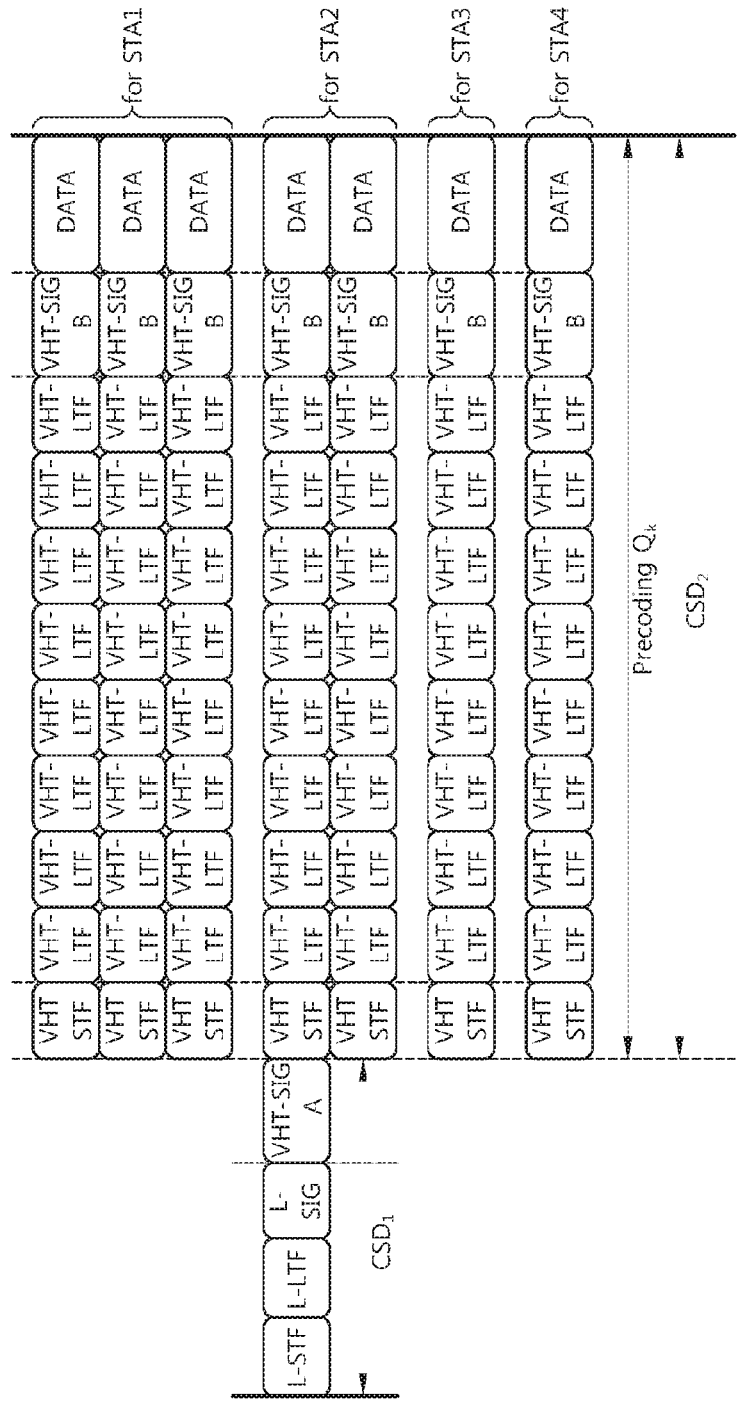

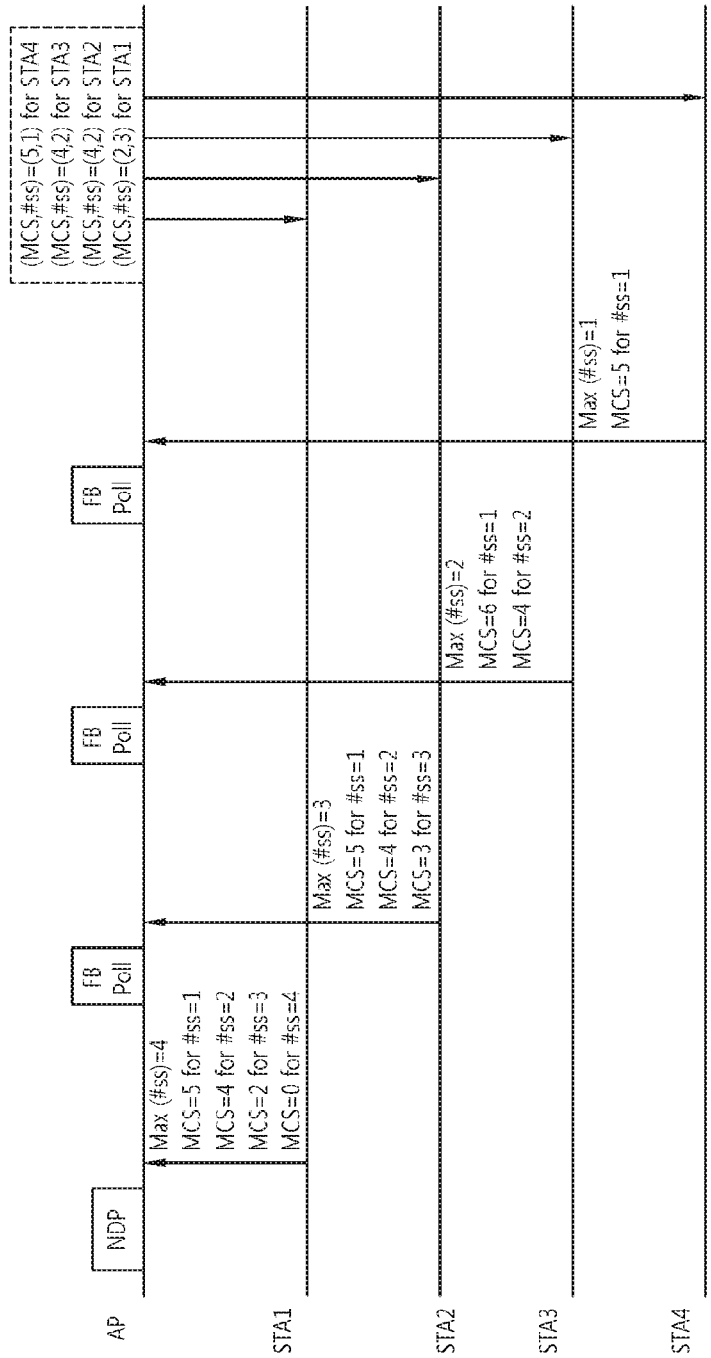
[Fig. 8]

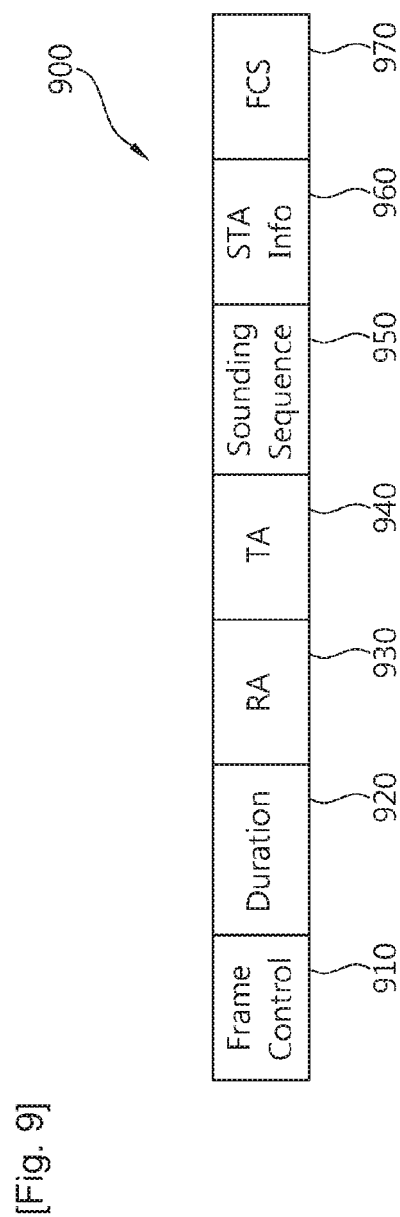
[Fig. 9]

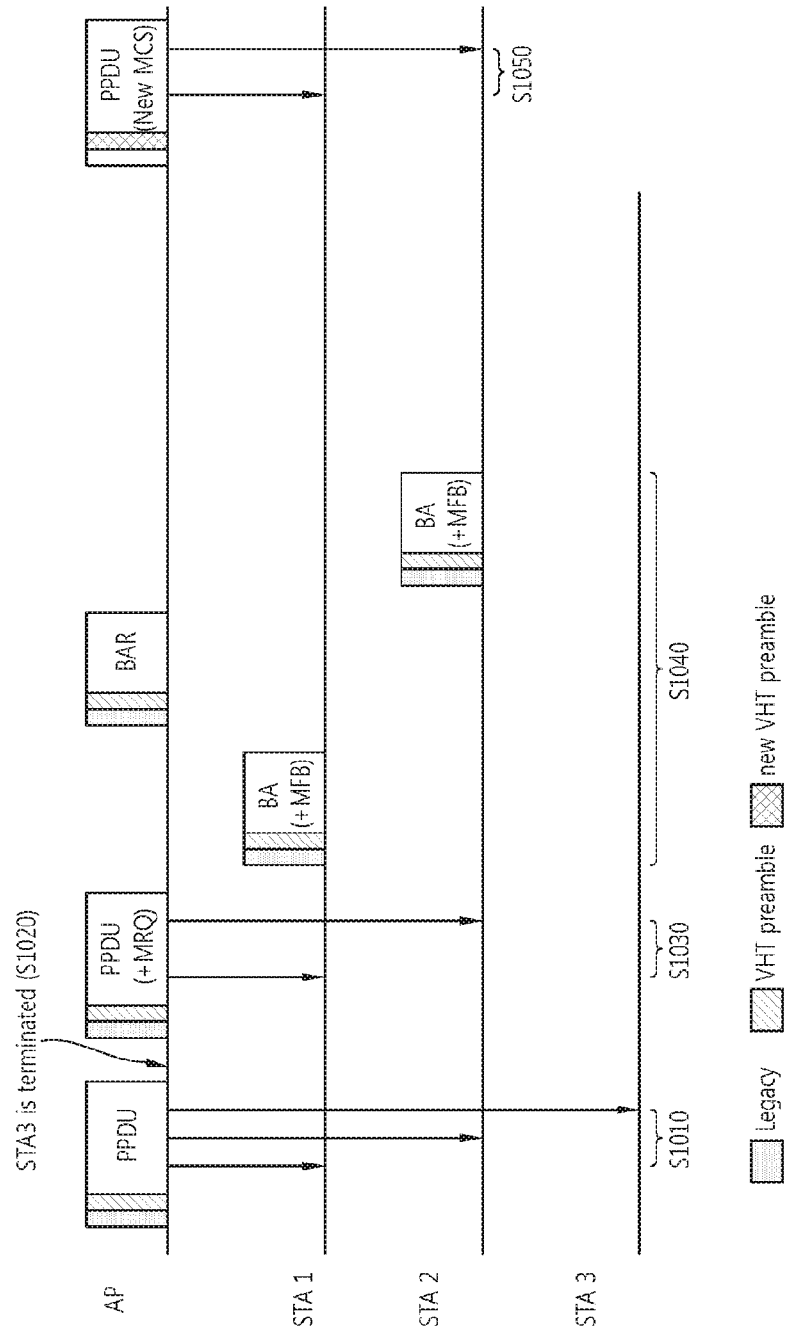

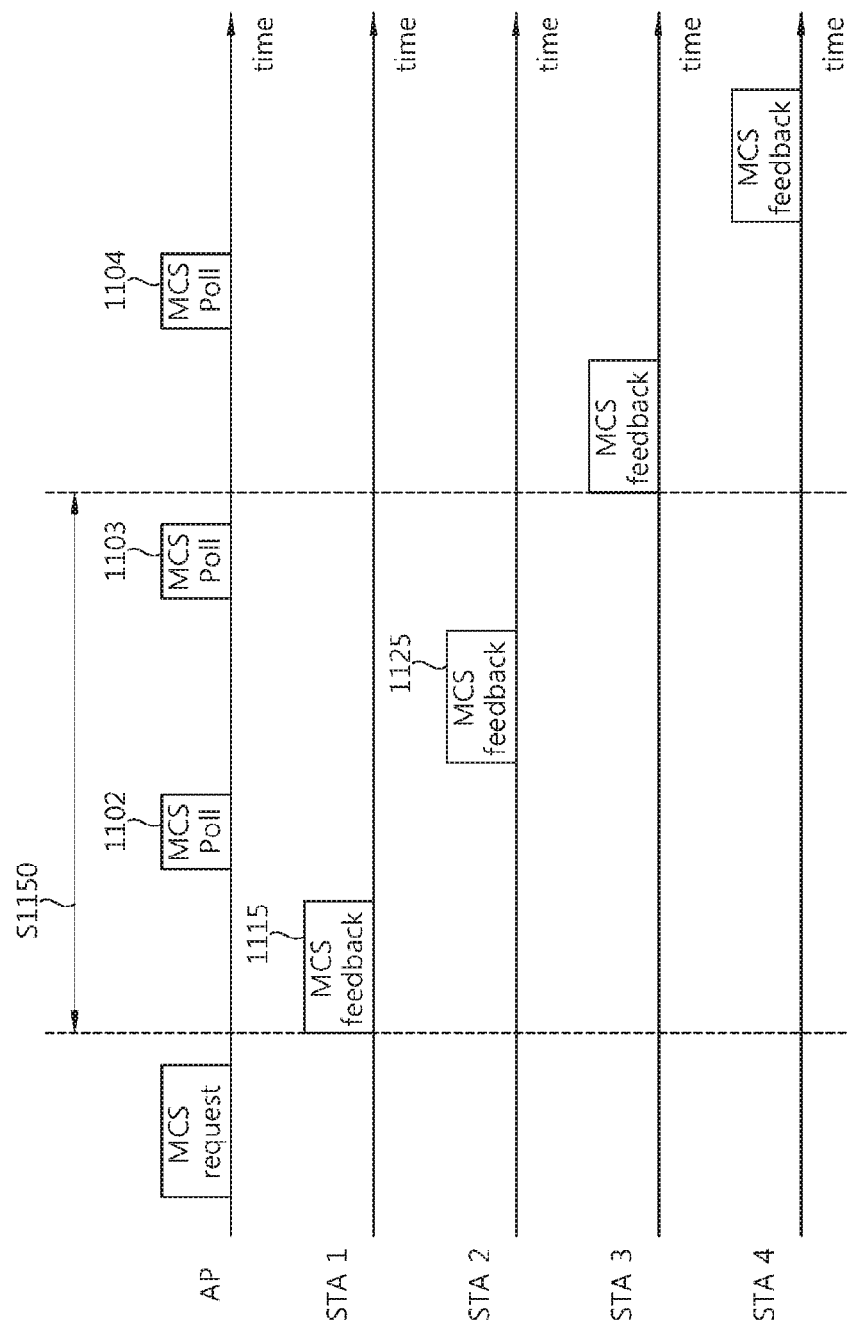

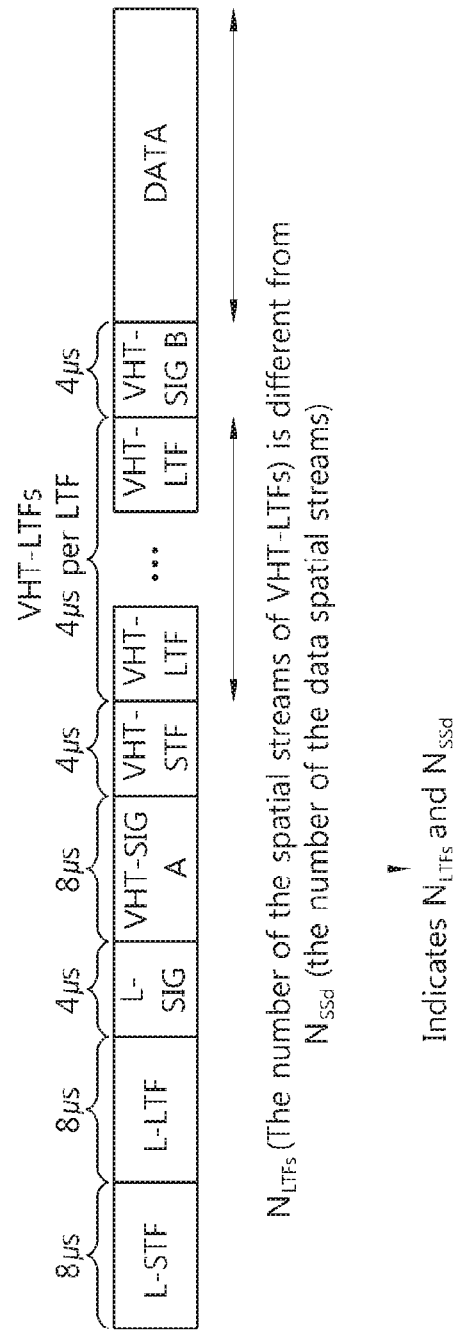
[Fig. 12]

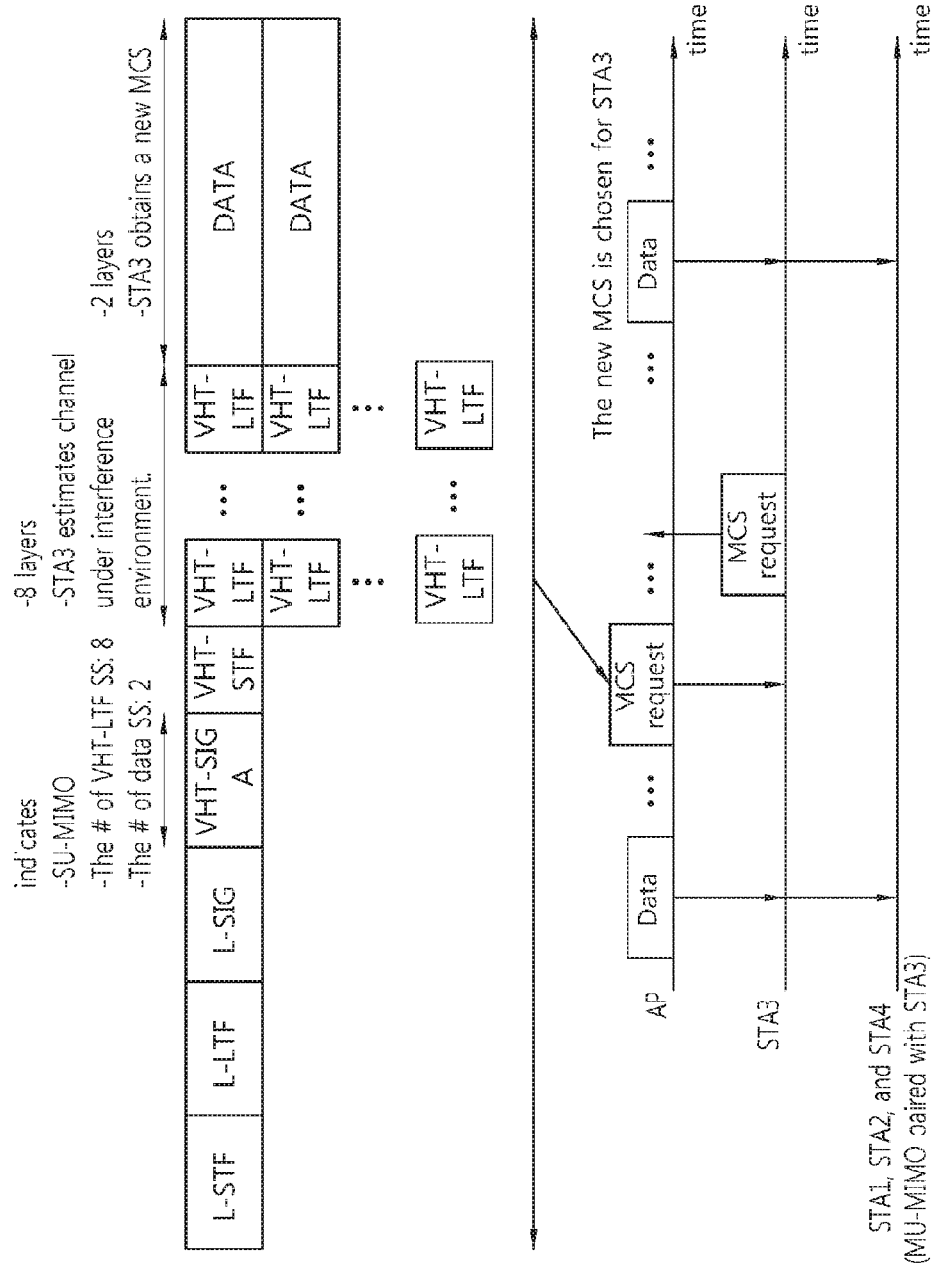

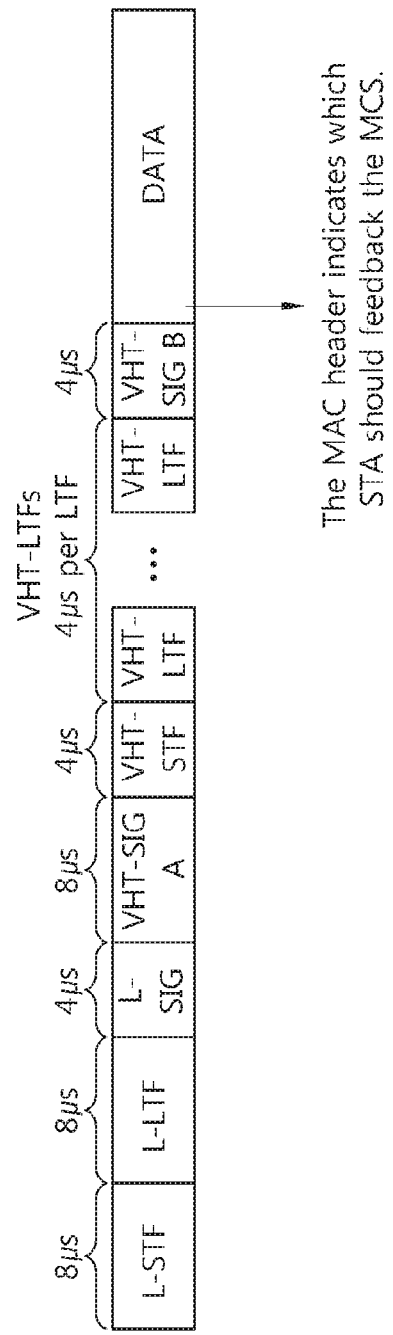
[Fig. 14]

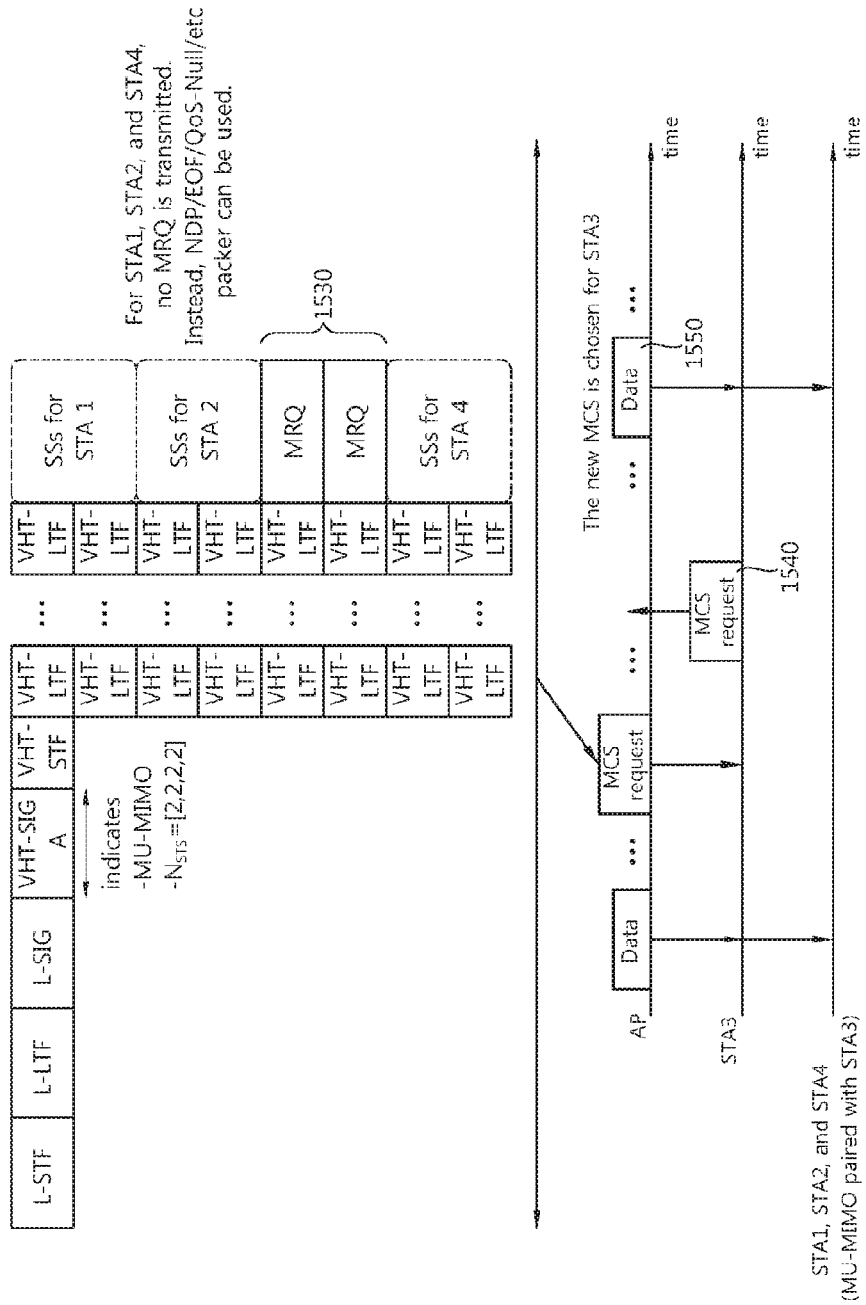
[Fig. 15]

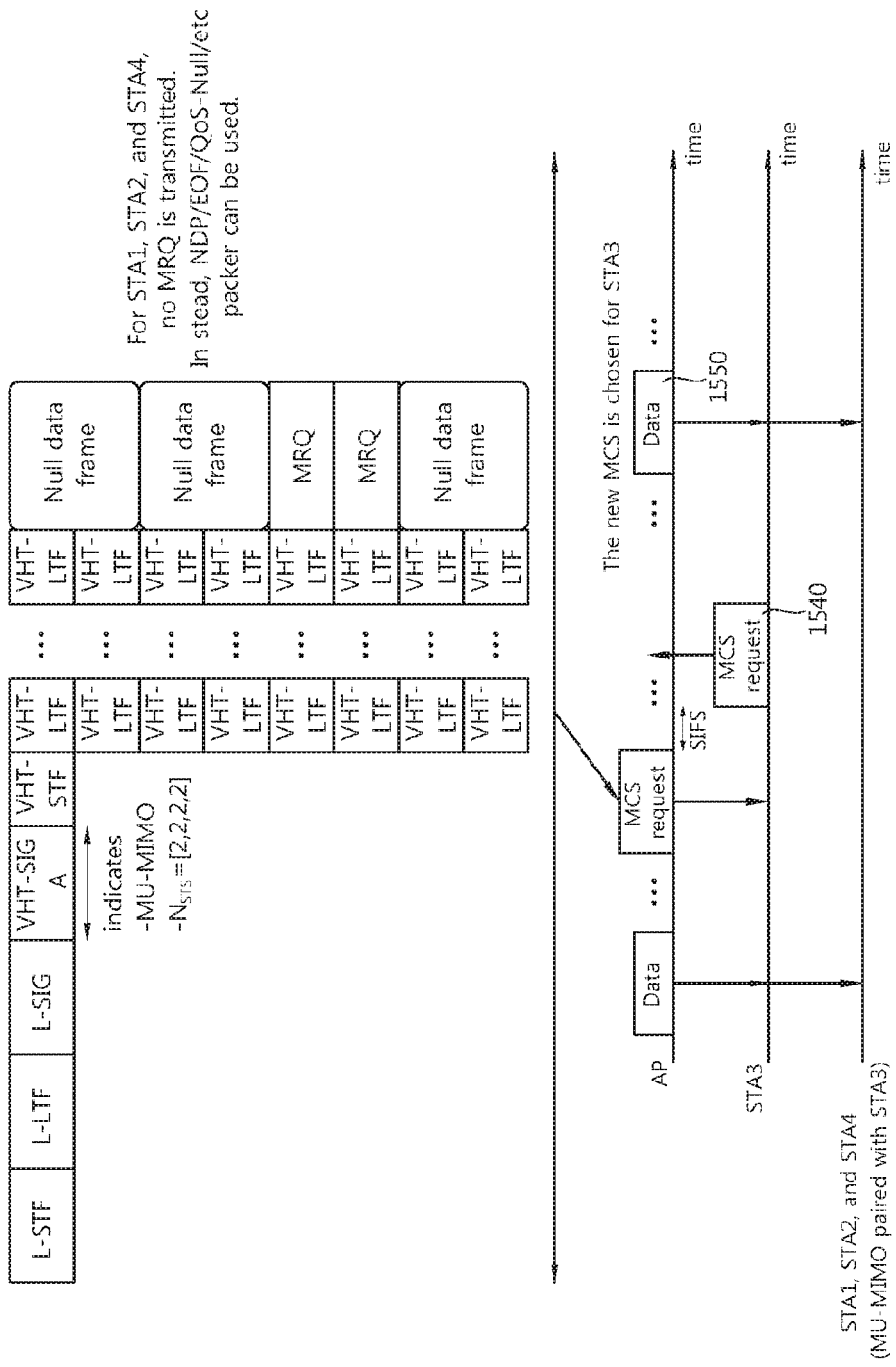

[Fig. 17]
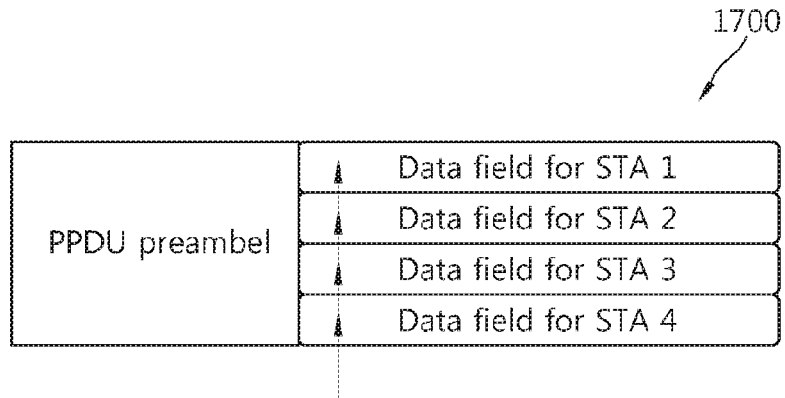
In MAC header, MCS feedback indication field is defined.
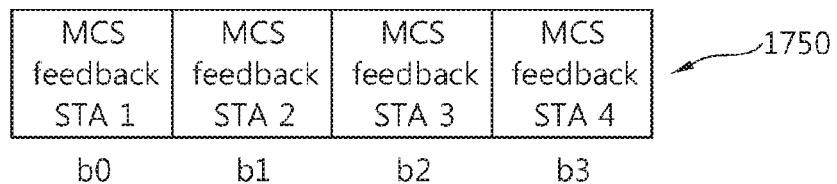
[Fig. 18]
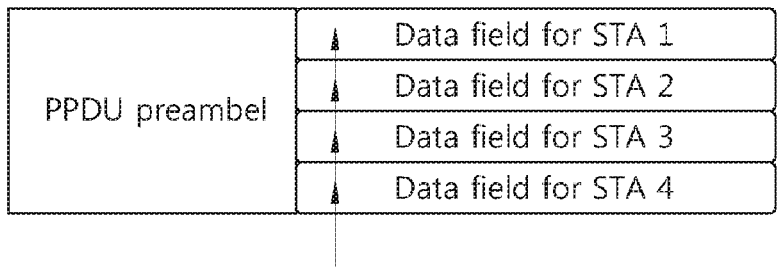
In MAC header, MCS feedback indication field is defined.
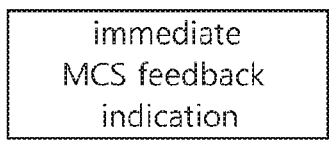

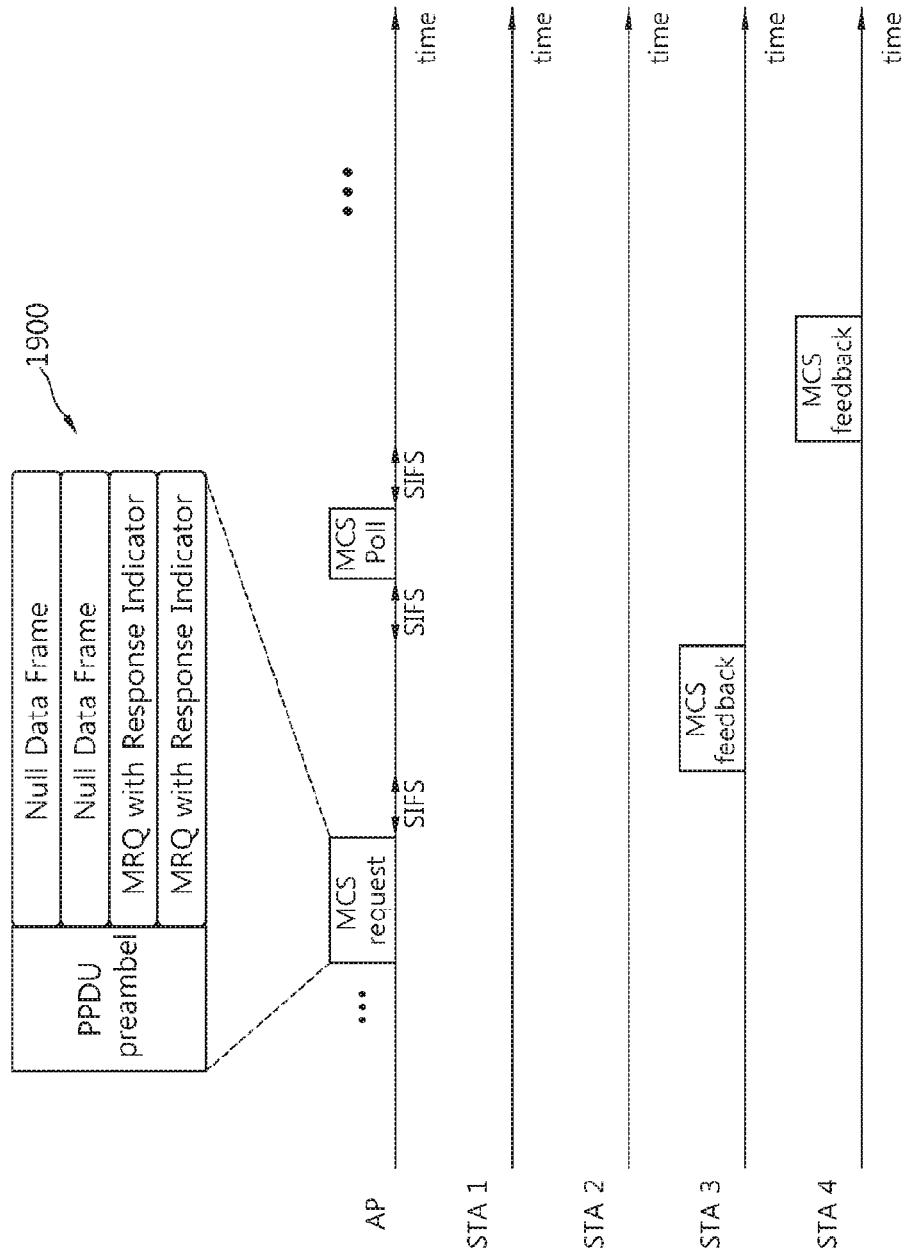

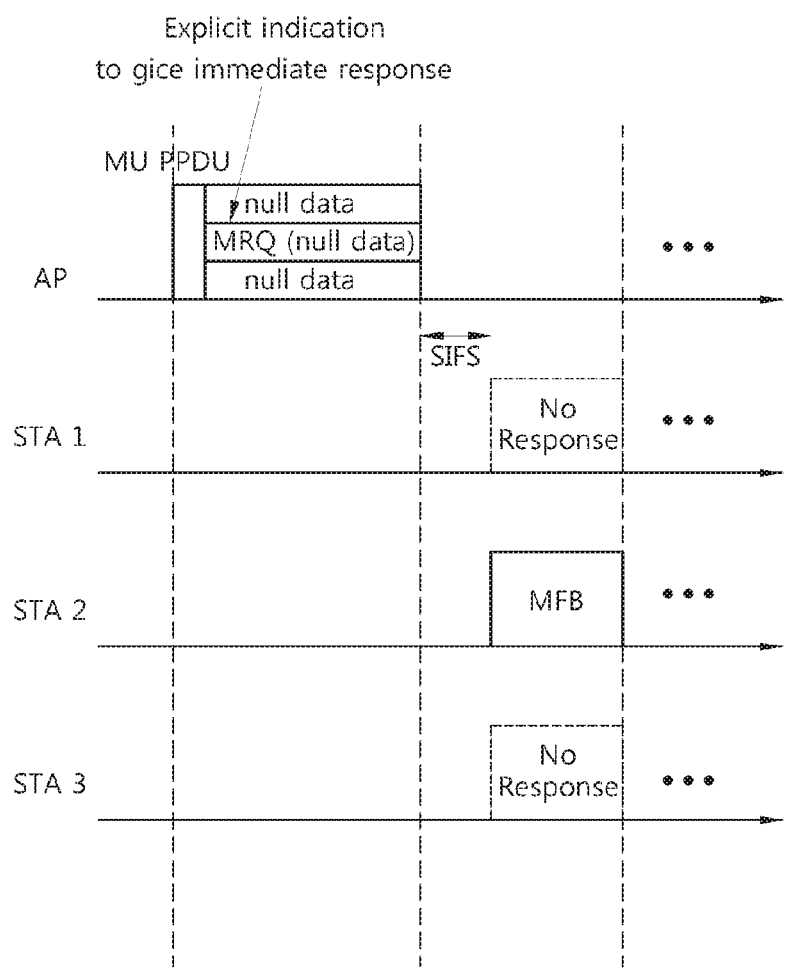
[Fig. 20]

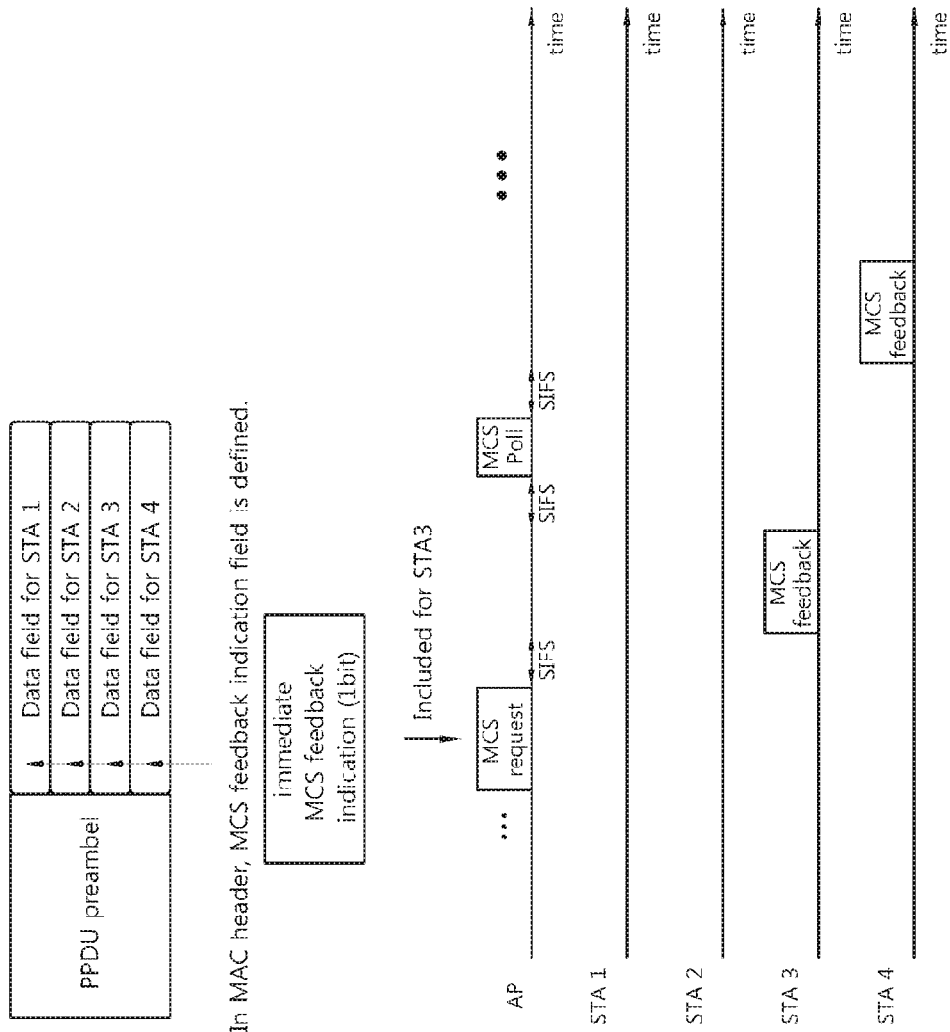
[Fig. 21]

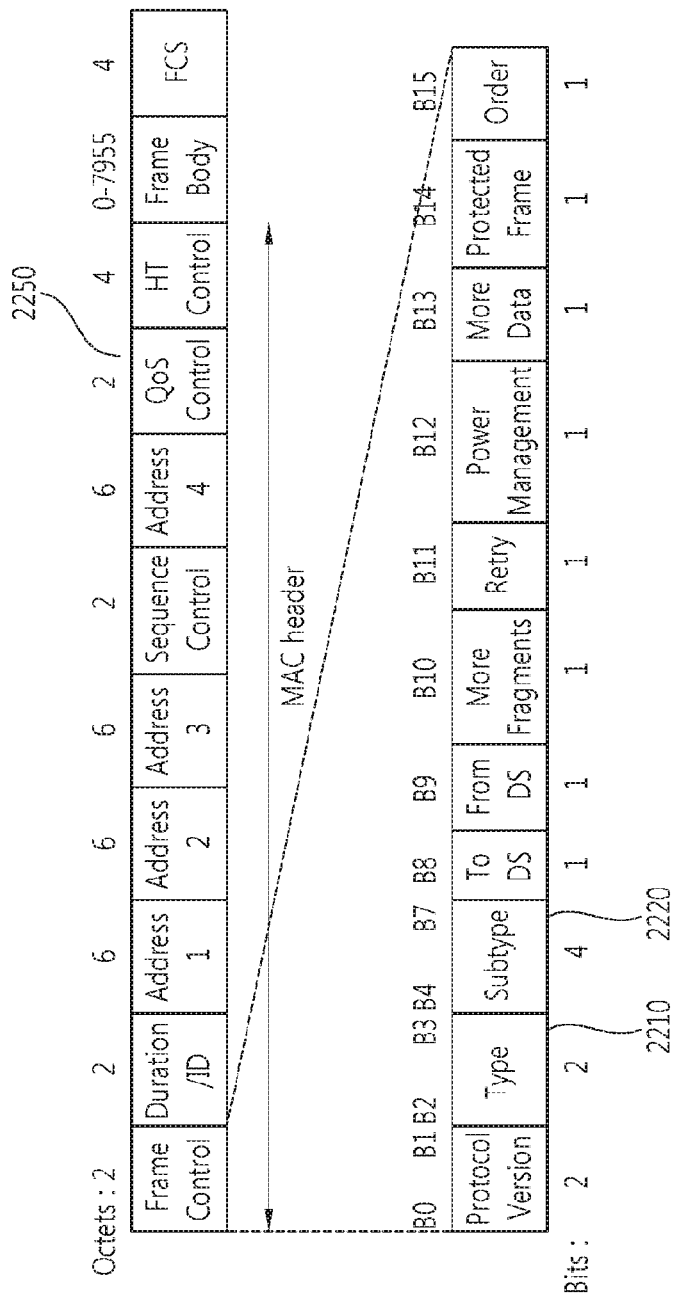

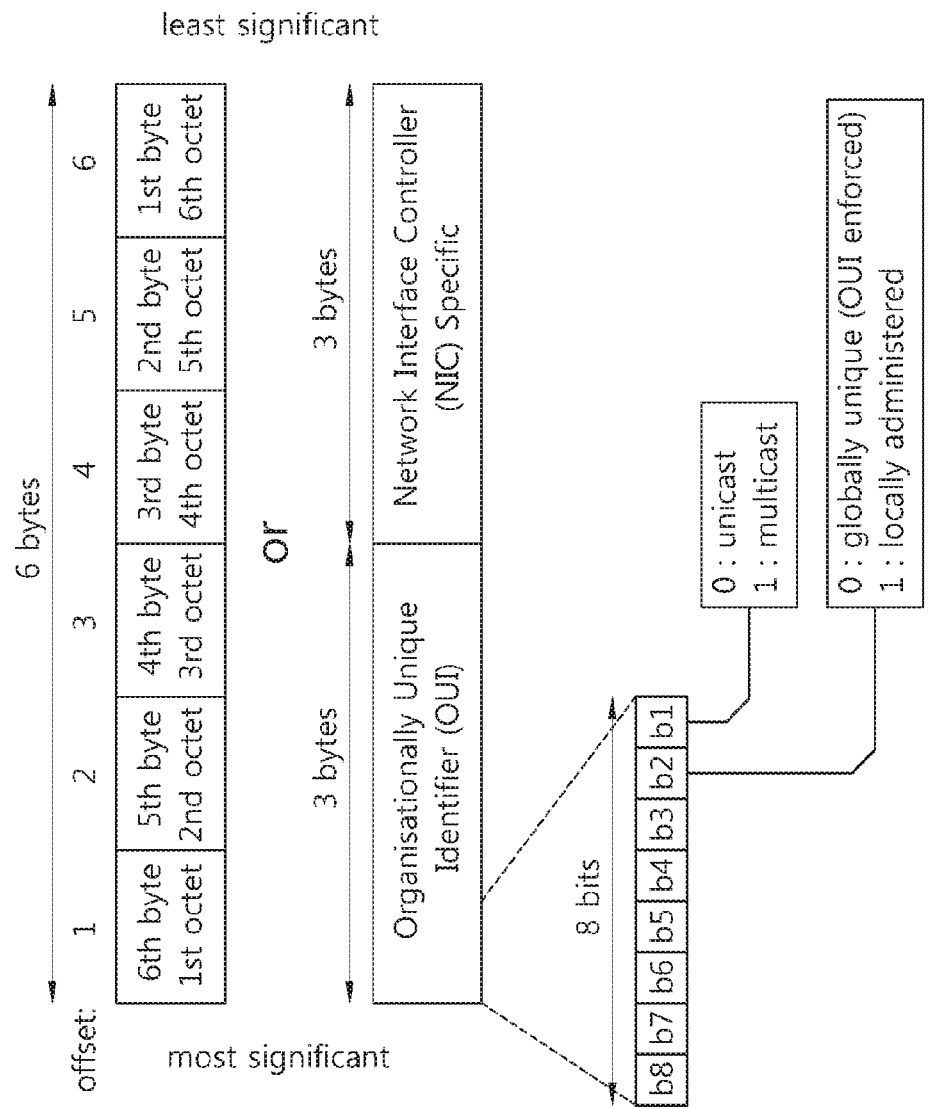
[Fig. 23]

[Fig. 24]
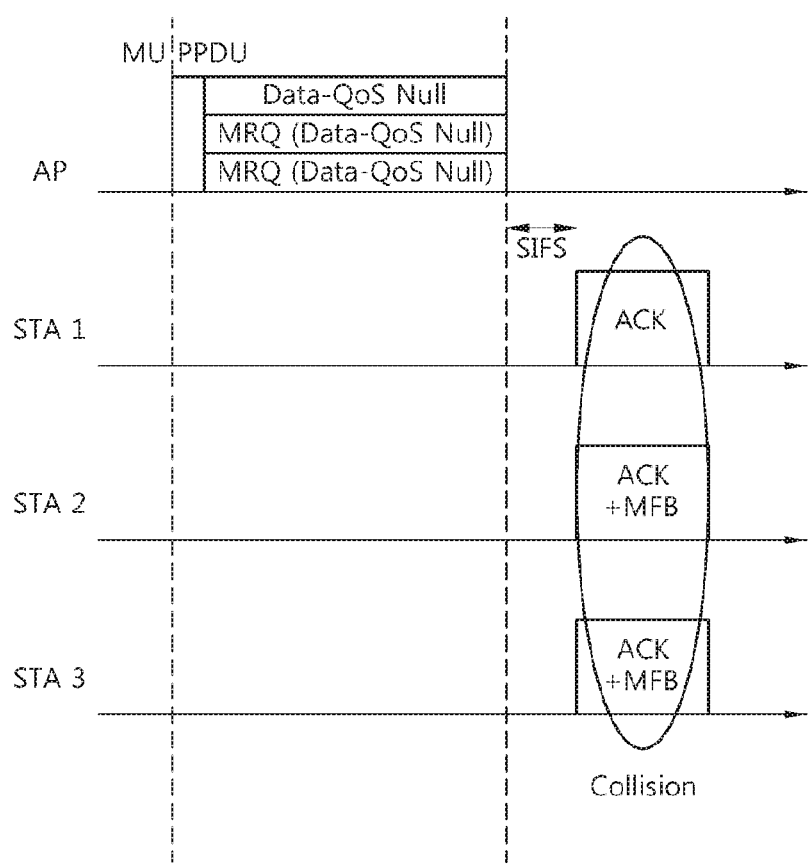

[Fig. 25]
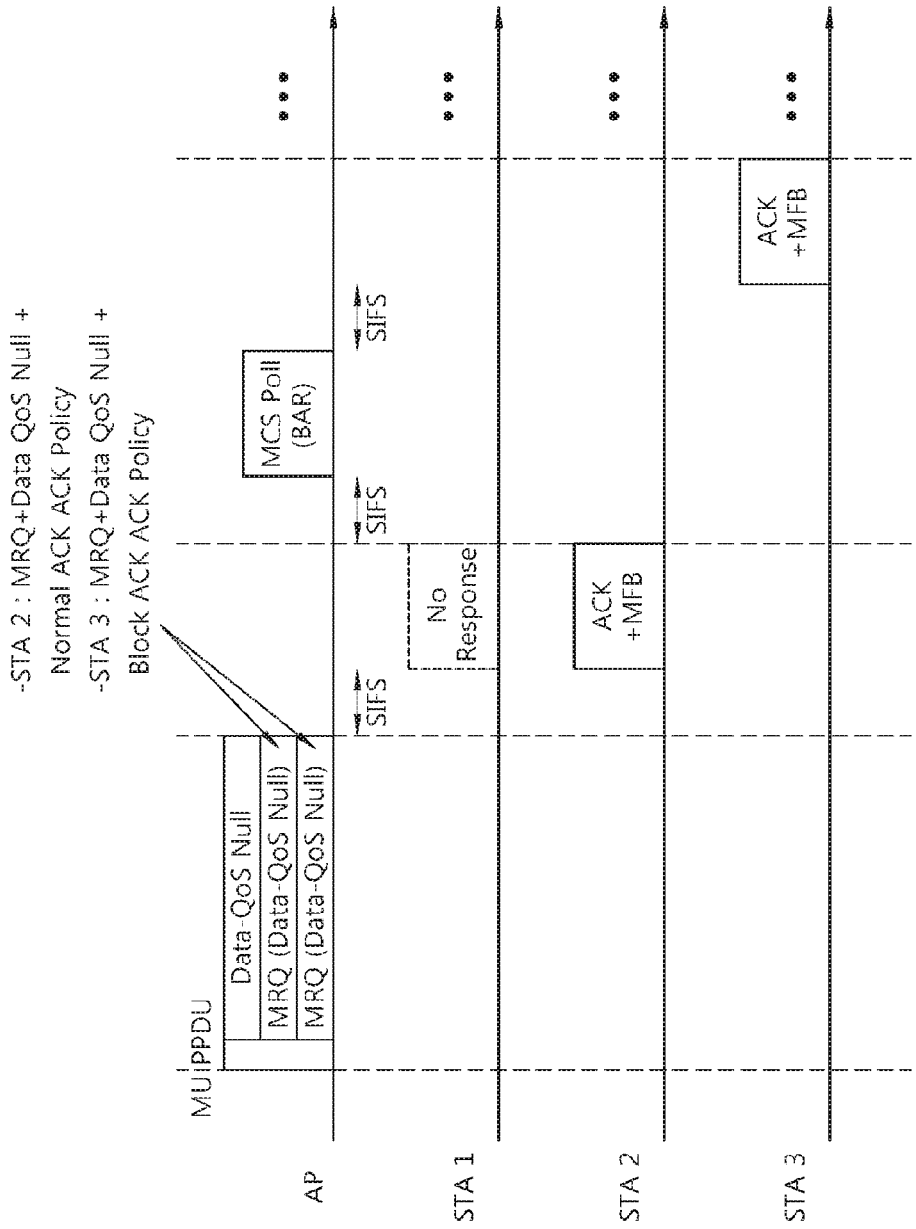

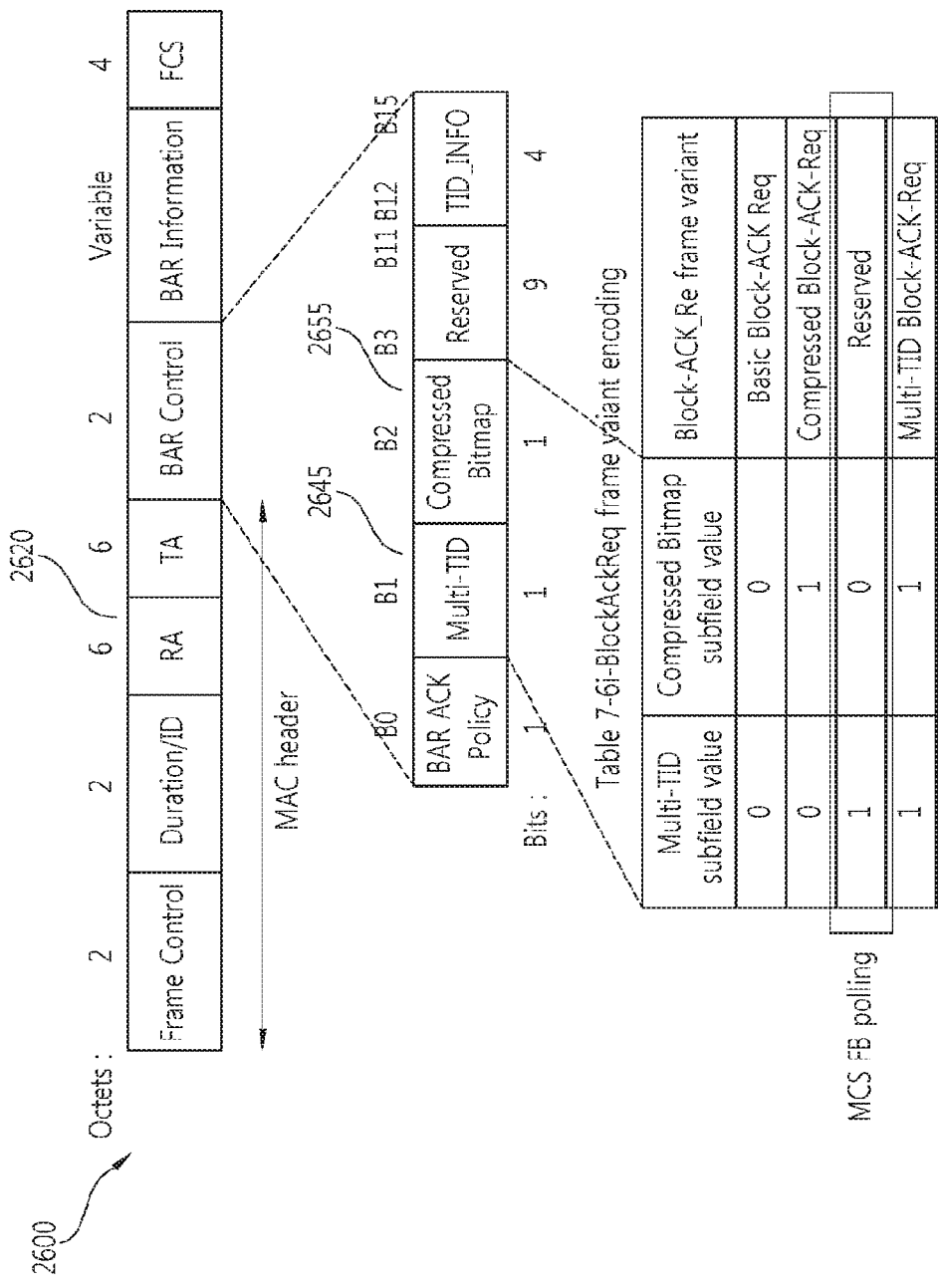

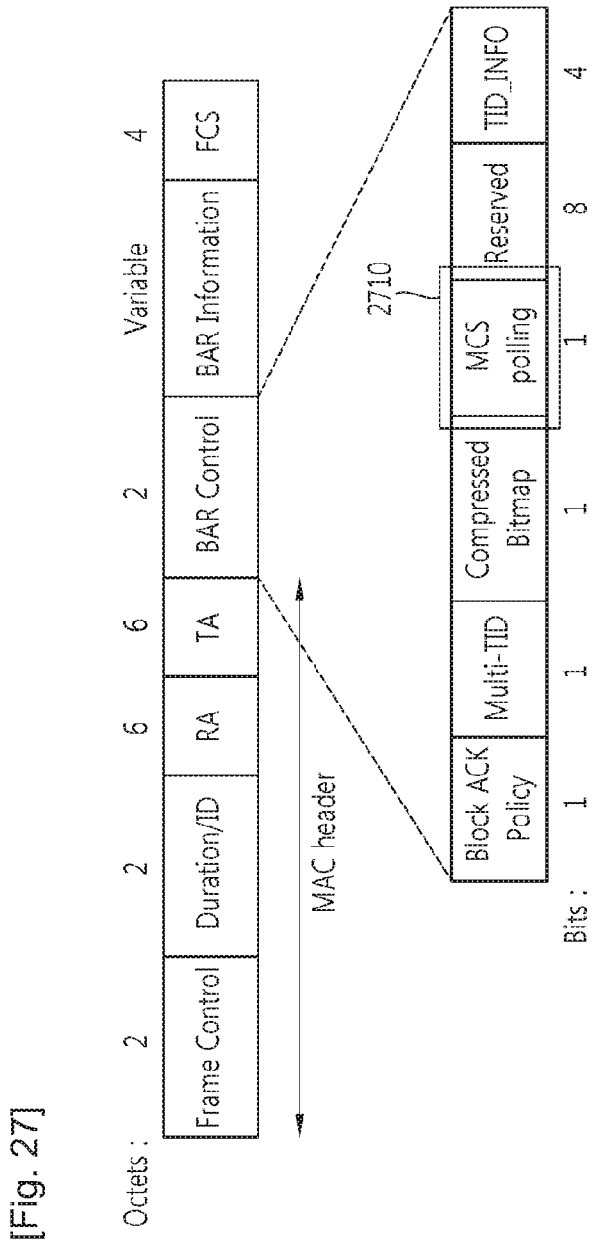
[Fig. 27]

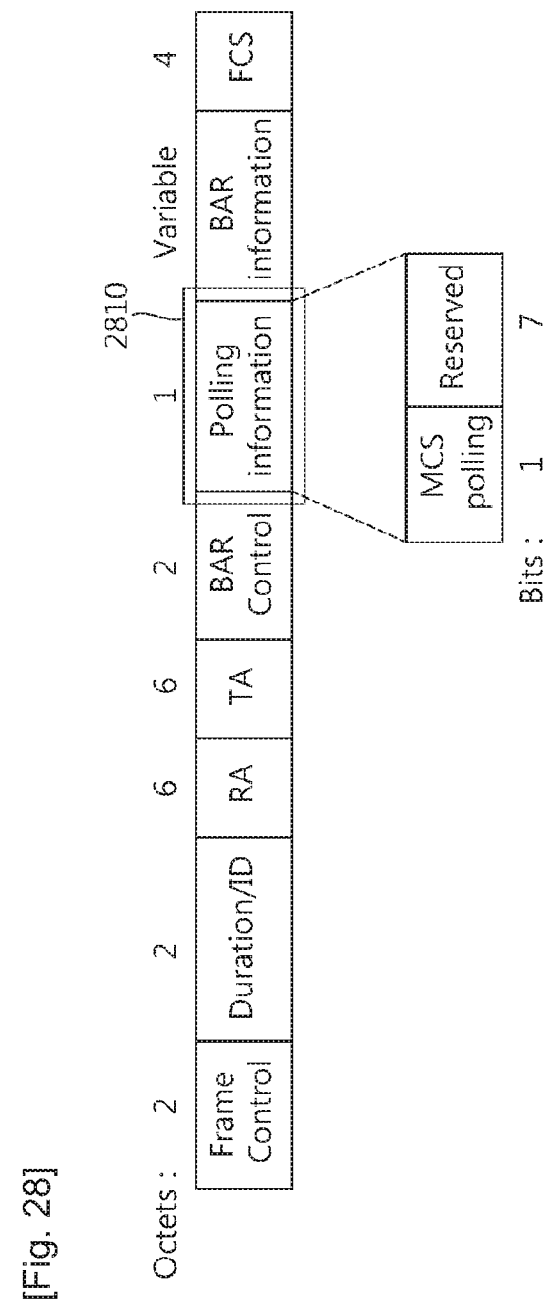
[Fig. 28]

[Fig. 29]
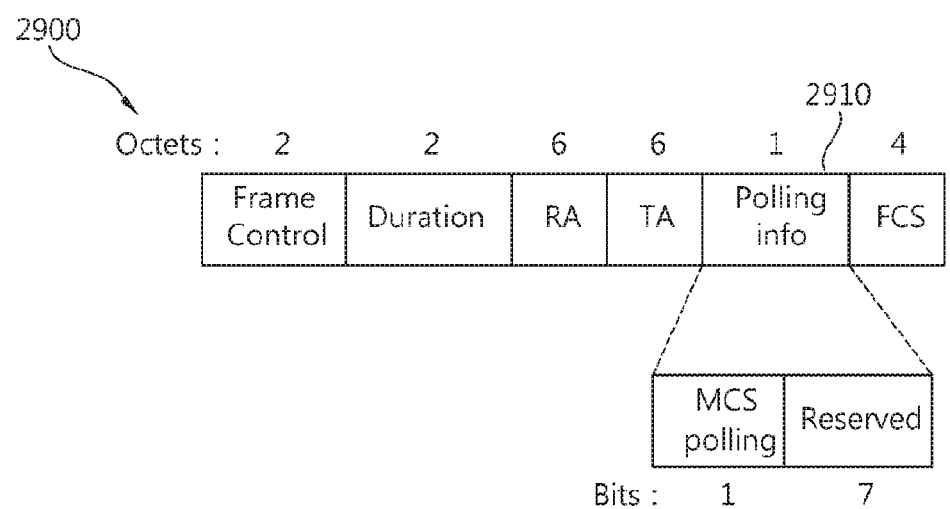

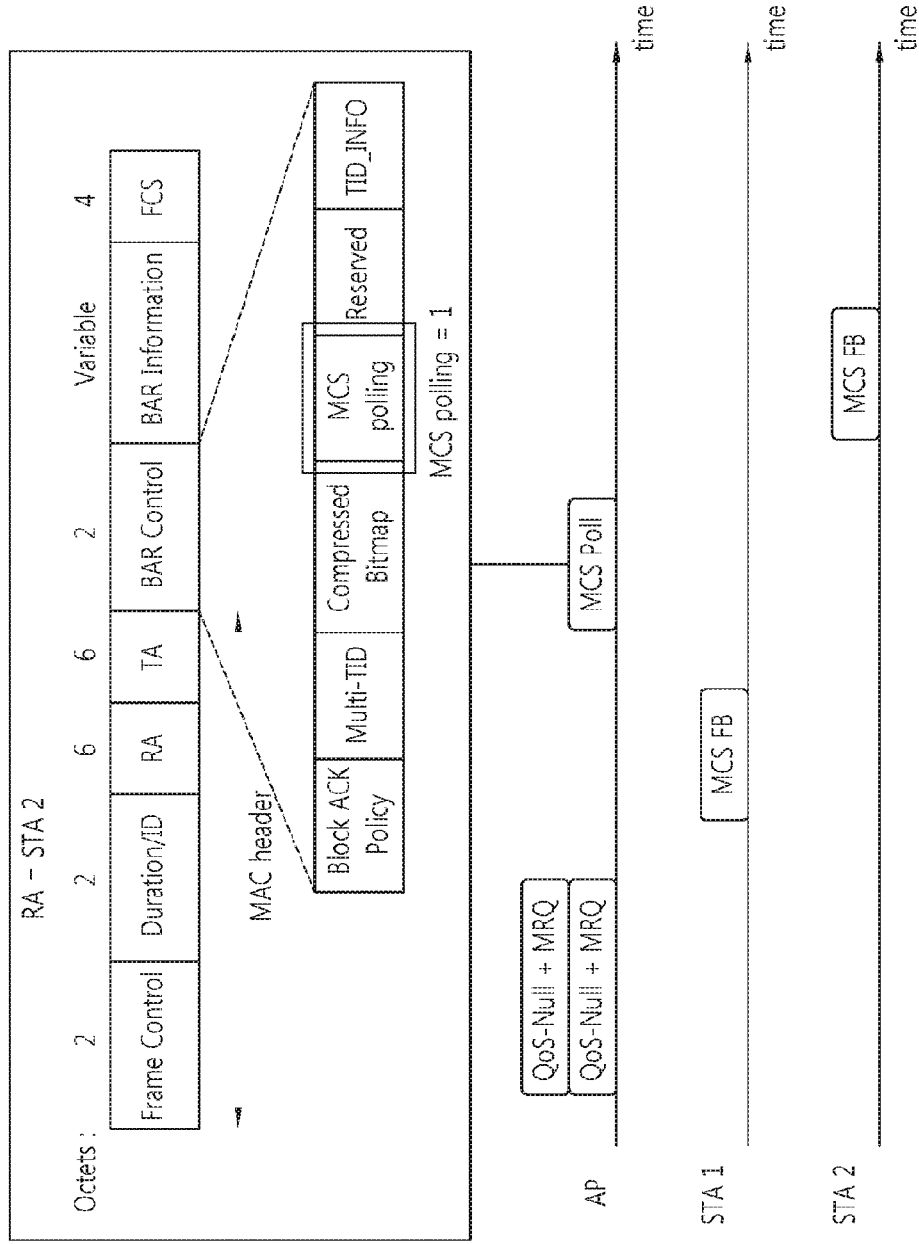

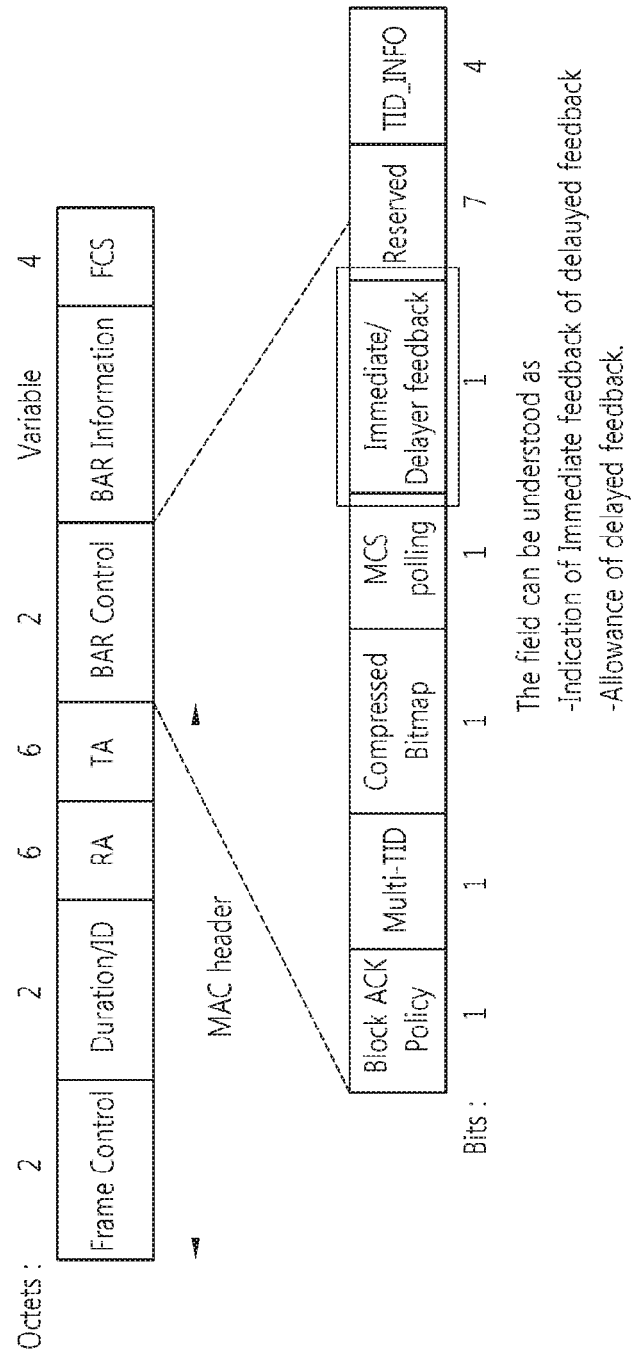
[Fig. 31]

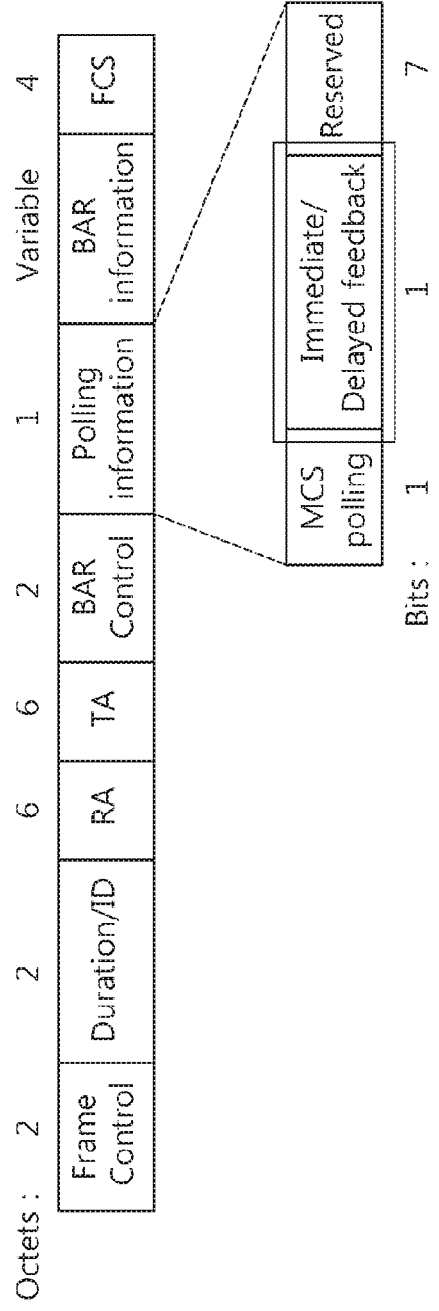

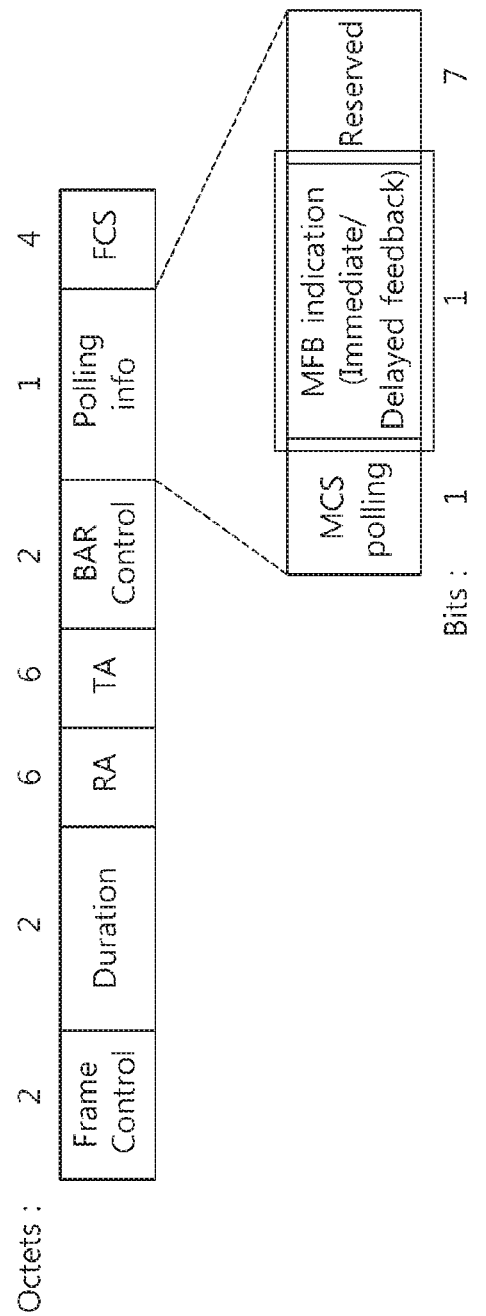
[Fig. 33]

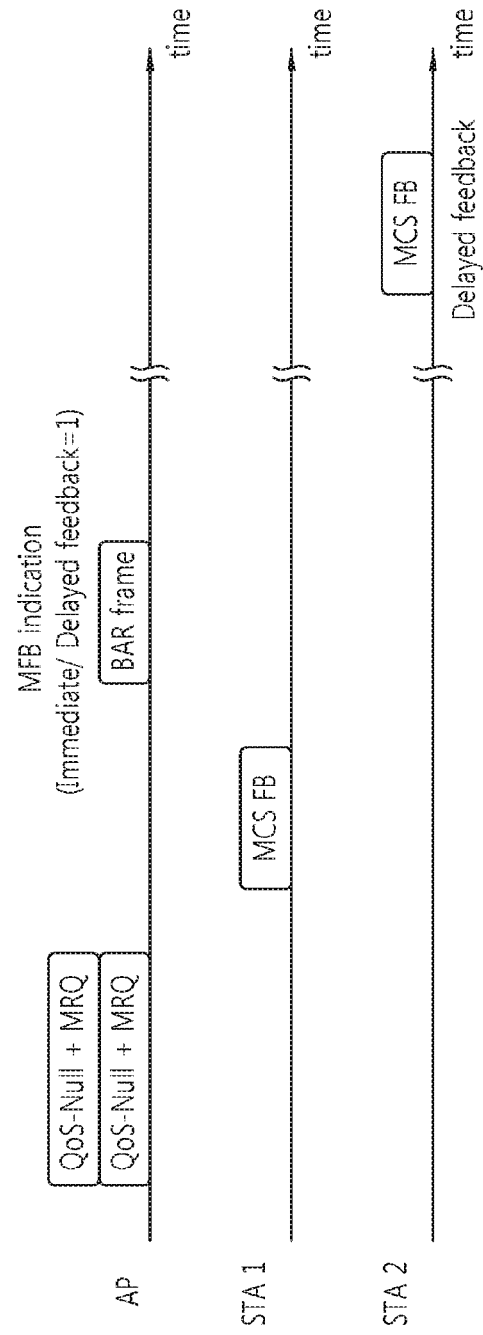
[Fig. 34]

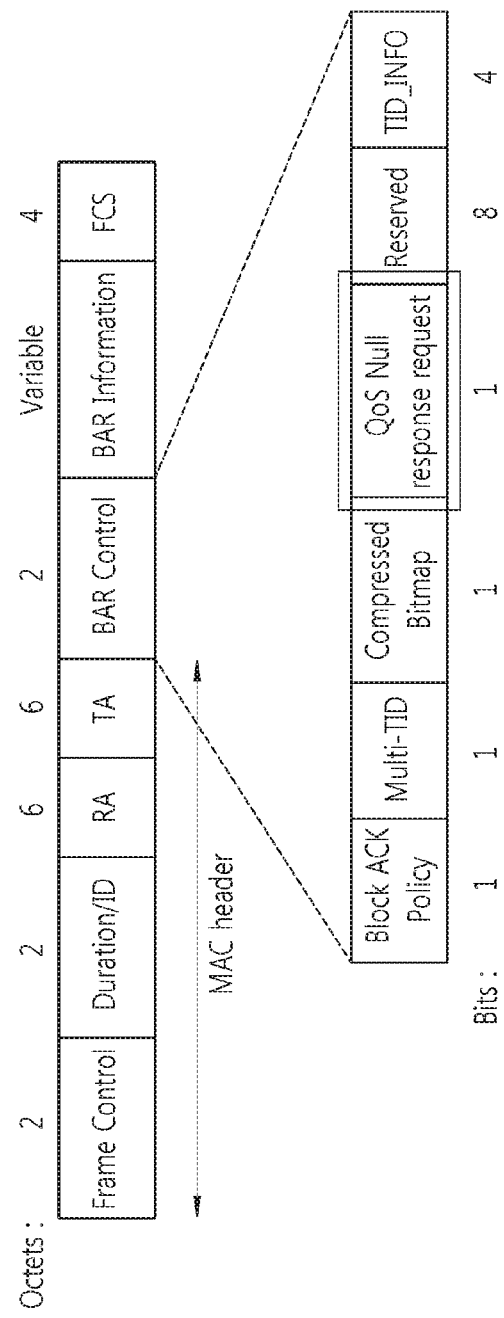
[Fig. 35]

[Fig. 36]
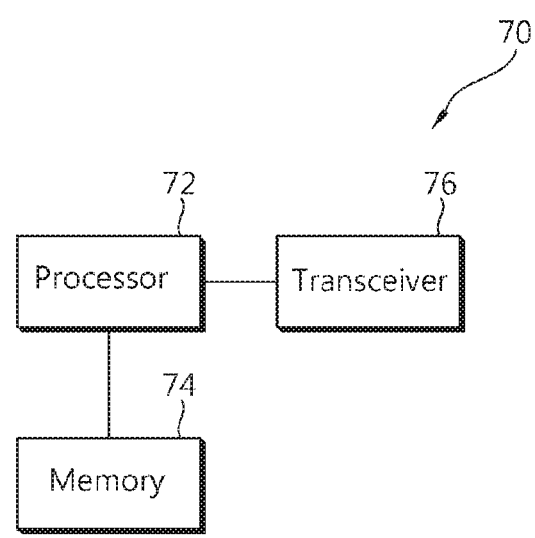

METHOD AND APPARATUS OF LINK ADAPTATION IN WIRELESS LOCAL AREA NETWORK

CROSS-REFERENCE TO RELATED APPLICATIONS

This application is a continuation of U.S. application Ser. No. 13/991,158, filed on May 31, 2013, now U.S. Pat. No. 9,350,428, which is the National Stage filing under 35 U.S.C. 371 of International Application No. PCT/KR2011/009278, filed on Dec. 1, 2011, which claims the benefit of U.S. Provisional Application No. 61/418,418, filed on Dec. 1, 2010, 61/418,873, filed on Dec. 2, 2010, 61/427,212, filed on Dec. 27, 2010 and 61/438,263, filed on Feb. 1, 2011, the contents of which are all hereby incorporated by reference herein in their entirety.

TECHNICAL FIELD

The present invention relates to wireless communication. More particularly, the present invention relates to a link adaptation method in a wireless local area network and an apparatus supporting the method.

BACKGROUND ART

Along with advancement of information and communications technology, various types of radio communication technologies are being developed. Among others, wireless local area network (WLAN) technology, based on radio frequency technology, enables users to connect to the Internet in homes and businesses, or in particular service areas by using portable terminals such as personal digital assistants (PDAs), laptop computers, portable multimedia players (PMPs), etc.

IEEE 802.11n is a more recent technology standard for WLAN introduced to overcome low communication speed, which has been considered as a weak point of WLAN. IEEE802.11n has been introduced to improve network throughput and reliability and extend operating range of a wireless network. More specifically, IEEE 802.11n supports high throughput (HT), where a maximum data processing rate is more than 540 Mbps. Also, IEEE 802.11n builds on multiple inputs and multiple outputs (MIMO) technology which employs multiple antennas for both of a transmitter-side and a receiver-side to minimize transmission error and optimize data rate.

As WLAN is widely accepted and applications based on WLAN are fast expanding, people have started to look for a new WLAN system capable of supporting a higher data processing rate than that supported by IEEE 802.11n. A next generation WLAN system supporting very high throughput (VHT) succeeds the IEEE 802.11n WLAN system; and the next generation WLAN system is one of IEEE 802.11 WLAN systems newly proposed these days to support data processing rate of more than 1 Gbps at a MAC service access point (SAP).

The next generation WLAN system supports data transmission based on a multi-user multiple input multiple output (MU-MIMO) method where multiple non-AP stations (STAs) access a channel simultaneously to utilize radio channels efficiently. According to MU-MIMO method, an AP can transmit a frame simultaneously to one or more STAs associated through MIMO-pairing.

Multiple STAs associated with an AP through MU-MIMO pairing can have the respective capabilities. Depending on the type, purpose, channel conditions, and the like of individual STA, bandwidth, modulation coding scheme (MCS), forward error correction (FEC), etc. can be varied.

According to MU-MIMO transmission scheme, a transmitter can transmit data to MU-MIMO paired multiple receivers through at least one or more spatial streams. At this time, a channel between the transmitter and a first receiver, and a channel between the transmitter and a second receiver can interfere with each other. In this way, channel interference between a transmitter and a receiver can block normal data transmission and reception, which may directly deteriorate the overall processing rate of a WLAN system. Therefore, to improve processing rate of a WLAN system supporting MU-MIMO transmission scheme, it is desirable to provide feedback of optimized modulation and coding scheme (MCS) recommendation sequentially by taking account of interference between different channels from each other. If multiple receivers provide feedback for a transmitter sequentially, a link adaptation method should be taken into account, including a method of determining the order of providing feedback among the receivers, a method of selecting a receiver for transmitting feedback, etc.

SUMMARY OF INVENTION

Technical Problem

The present invention has been made in an effort to provide a link adaptation method that can be used in a wireless LAN system supporting MU-MIMO transmission.

Solution to Problem

In an aspect of the present invention, a method of link adaptation performed by an access point supporting multi user (MU) multiple input multiple output (MIMO) in wireless local area network system includes transmitting, to a first station, a physical layer convergence procedure (PLCP) protocol data unit (PPDU) containing a modulation and coding scheme (MCS) request (MRQ), and receiving, from the first station, a MCS feedback (MFB) in response to the MRQ, wherein the first station is one of destination stations of MU-MIMO transmission performed by the access point, and the MFB includes a recommended MCS value computed, by the first station, on the assumption that the first station, as a member of the destination stations, receives data transmitted over at least one spatial stream allocated to the first station in MU-MIMO transmission.

The PPDU may be a single user (SU) PPDU that carries a single PLCP service data unit (PSDU) for the first station, and wherein the SU PPDU may be transmitted over at least one spatial stream allocated to the first station, and include at least one long training field (LTF) used for channel estimation of all spatial streams used for MU-MIMO transmission of a MU PPDU that carries independent PSDUs for the destination stations.

The number of the at least one LTF may be different form the number of the at least one spatial stream allocated to the first station.

The number of the at least one LTF may be determined by the number of spatial streams for the destination stations.

The method may further include transmitting, to the destination stations, a MU PPDU, wherein the MU PPDU may include data for the first station, the data being modulated and coded by a MCS value determined, by the access point, by referring the recommended MCS value.

The PPDU may be a MU PPDU that carries independent PSDUs for the destination stations and be transmitted to the destination station by the MU-MIMO transmission.

The MRQ may be contained in a data field of the MU-PPDU, the data field being transmitted over at least one spatial stream allocated to the first station.

In another aspect of the present invention, a method of link adaptation performed by an access point supporting MU-MIMO) in WLAN includes transmitting, to destination stations of MU-MIMO transmission, a physical layer convergence procedure (PLCP) protocol data unit (PPDU) containing an indicator indicating a target station of a modulation and coding scheme (MCS) request (MRQ), and receiving, from the target station, a MCS feedback (MFB), wherein the target station is one of destination stations, and the MFB includes a recommended MCS value computed, by the first station, on the assumption that the target station, as a member of the destination stations, receives data transmitted over at least one spatial stream allocated to the first station in MU-MIMO transmission.

The MFB may be transmitted in a block acknowledgement (BA) frame transmitted, by the target station, to notify the access point of whether the PPDU for the target station is received successfully by the target stations.

The indicator may be configured in an MFB indication field, the MFB indication field being included in a data field of the PPDU transmitted over at least one spatial stream allocated to the target station, The PPDU may further include MFB type indicator indicating whether the target station transmits the MFB to the access point immediately or not.

In still another aspect of the present invention, a wireless apparatus includes a processor configured to transmit, to a first station, a physical layer convergence procedure (PLCP) protocol data unit (PPDU) containing a modulation and coding scheme (MCS) request (MRQ), and receive, from the first station, a MCS feedback (MFB) in response to the MRQ, wherein the first station is one of destination stations of MU-MIMO transmission performed by the access point, and the MFB includes a recommended MCS value computed, by the first station, on the assumption that the first station, as a member of the destination stations, receives data transmitted over at least one spatial stream allocated to the first station in MU-MIMO transmission.

The PPDU may be a single user (SU) PPDU that carries a single PLCP service data unit (PSDU) for the first station, and wherein the SU PPDU may be transmitted over at least one spatial stream allocated to the first station, and include at least one long training field (LTF) used for channel estimation of all spatial streams used for MU-MIMO transmission of a MU PPDU that carries independent PSDUs for the destination stations.

The processor may be further configured to transmit, to the destination stations, a MU PPDU, wherein the MU PPDU may include data for the first station, the data being modulated and coded by a MCS value determined, by the access point, by referring the recommended MCS value.

The PPDU may be a MU PPDU that carries independent PSDUs for the destination stations and be transmitted to the destination station by the MU-MIMO transmission, and wherein the MRQ may be contained in a data field of the MU-PPDU, the data field being transmitted over at least one spatial stream allocated to the first station.

Advantageous Effects of Invention

A link adaptation procedure intended for multiple stations (STAs) can tell each of the multiple STAs about the timing of MCS feedback transmission. Also, the link adaptation procedure can request MCS feedback transmission from part of the multiple STAs and receive only the MCS feedback from part of receivers. Even if a plurality of MCS feedback is transmitted to an access point (AP), conflict among the plurality of MCS feedback can be avoided and overhead due to the link adaptation procedure can be reduced.

BRIEF DESCRIPTION OF DRAWINGS

FIGS. 1 and 2 schematically show configurations of examples of a WLAN system.

FIG. 3 illustrates physical layer architecture (PHY architecture) of a WLAN system defined by the IEEE 802.11.

FIG. 4 is an operating procedure illustrating an authentication and an association procedure of a station in a WLAN system.

FIG. 5 illustrates one example of a PLCP frame format which can be used for a WLAN system.

FIG. 6 illustrates a link adaptation method based on a normal PPDU including data.

FIG. 7 illustrates a example of a MU PPDU format.

FIG. 8 illustrates a link adaptation method based on NDP.

FIG. 9 is a block diagram illustrating a format of an NDPA frame.

FIG. 10 is another example of link adaptation.

FIG. 11 is an example illustrating that overhead can be increased when a conventional link adaptation method is employed.

FIG. 12 illustrates one example of a SU-MIMO packet which can be used for a link adaptation procedure according to one embodiment of the present invention.

FIG. 13 illustrates a link adaptation procedure according to one embodiment of the present invention.

FIG. 14 illustrates an MU-PPDU which can be used for a link adaptation method according to an embodiment of the present invention.

FIG. 15 illustrates an STA-selective link adaptive method by using an MU-PPDU according to an embodiment of the present invention.

FIG. 16 illustrates another example of an STA-selective link adaptation procedure.

FIG. 17 illustrates one example of a method for indicating destination STAs of an MCS feedback request according to an embodiment of the present invention.

FIG. 18 illustrates one example of a MAC frame format.

FIG. 19 illustrates one example of an STA-selective link adaptation method according to another embodiment of the present invention.

FIGS. 20 and 21 illustrate one example of an STA-selective link adaptation method according to another embodiment of the present invention.

FIG. 22 illustrates a MAC frame format used for transmitting a data packet in a WLAN system.

FIG. 23 illustrates one example of setting up the address field.

FIG. 24 illustrates a problem that can occur when multiple receiving STAs generate immediate ACKs simultaneously and transmit the immediate ACKs.

FIG. 25 illustrates an embodiment of the present invention for preventing collision during ACK transmission by using the ACK policy described above.

FIG. 26 is a block diagram of one example of a format of a poll frame according to an embodiment of the present invention.

FIGS. 27, 28 and 29 illustrate examples of an MCS poll frame format according to the present invention.

FIG. 30 illustrates a method of transmitting MCS feedback sequentially by using an MCS poll frame.

FIG. 31 illustrates one example of an MCS poll frame including the feedback type field.

FIGS. 32 and 33 illustrate one example of the feedback type field.

FIG. 34 illustrates an embodiment of the present invention using an MCS poll frame including a feedback type field.

FIG. 35 illustrates an MCS poll frame including an MFB indicator according to an embodiment of the present invention.

FIG. 36 is a block diagram illustrating a wireless apparatus to which an embodiment of the present invention can be applied.

MODE FOR THE INVENTION

In what follows, a link adaptation method for a wireless local area network (WLAN) system and an apparatus supporting the method according to embodiments of the present invention will be described in detail with reference to appended drawings.

FIGS. 1 and 2 schematically show configurations of examples of a WLAN system to which embodiments of the present invention can be applied.

As shown in FIGS. 1 and 2, a WLAN system comprises one or more basic service sets (BSSs). A BSS is a set of stations (STAs) which can be successfully synchronized and communicate with each other, but is not limited to a specific area. A BSS can be divided into an infrastructure BSS (IBSS) and an independent BSS; the former is shown in FIG. 1 while the latter in FIG. 2. The infrastructure BSS BSS1 and BSS2 includes one or more Non-AP STAs STA1, STA2, STA3, and STA4, an access point (AP) which is an STA providing a distribution service, and a distribution system (DS) connecting multiple APs AP1 and AP2. On the other hand, the IBSS does not include an AP and all the STAs are mobile stations STA6, STA7, and STA8. Since access to the DS is not permitted, the IBSS forms a self-contained network.

An STA is a functional unit including a medium access control (MAC) interface and a physical layer interface for a wireless medium in accordance with the IEEE 802.11 standard and includes both APs and non-AP stations in a broad sense. A station for wireless communication includes a processor and a transceiver and further includes a user interface and a display unit. The processor is a functional unit designed to generate a frame to be transmitted through a wireless network or to process a frame received through the wireless network and serves to perform a variety of functions for controlling the station. The transceiver is functionally connected to the processor and is a unit designed to transmit and receive frames through a wireless network.

A portable terminal operated by a user is a non-AP STA (STA1, STA3, STA4, STA6, STA7, and STA8). Simply, an STA may denote a non-AP STA. The non-AP STA may be called in different ways: a wireless transmit/receive unit (WTRU), a user equipment (UE), a mobile station (MS), a portable terminal, or a mobile subscriber unit.

The AP (AP1 and AP2) is a functional entity providing connection to the DS through a wireless medium for the stations associated with the AP. Normally, communication among the non-AP STAs in the infrastructure BSS including an AP is made through the AP; however, the non-AP STAs may communicate directly with each other when a direct link is established among them. The AP, in addition to its name of access point, may be called a convergence controller, a base station (BS), a node-B, a base transceiver system (BTS), or a site controller.

Multiple infrastructure BSSs can be connected to each other through the DS. The multiple BSSs connected through the DS are called an extended service set (ESS). STAs included in an ESS can communicate with each other and non-AP STAs can move from one BSS to another BSS within the same ESS while communicating without disconnection.

The DS is a mechanism for allowing an AP to communicate with another AP. An AP can transmit a frame for the STAs associated with a BSS managed by the AP, forward a frame when one STA moves to another BSS, or forward a frame to an external network such as a wired network. The DS may not necessarily be a network and is not limited to a particular type as long as it can provide a predetermined distribution service defined in the IEEE 802.11 standard. For example, the DS may be a wireless network such as a mesh network or a physical structure connecting APs to each other.

FIG. 3 illustrates physical layer architecture (PHY architecture) of a WLAN system defined by the IEEE 802.11.

The PHY architecture of the IEEE 802.11 comprises a PHY layer management entity (PLME), a physical layer convergence procedure (PLCP) sub-layer 20, and a physical medium dependent (PMD) sub-layer 10. The PLME provide a management function for the physical layer in cooperation with a MAC layer management entity (MIME). The PLCP sub-layer 20, located between a MAC sub-layer 30 and the PMD sub-layer 10, forwards a MAC protocol data unit (MPDU) to the PMD sub-layer 10 according to an instruction given by the MAC layer or forwards a frame coming from the PMD sub-layer 10 to the MAC sub-layer 30. The PMD sub-layer 10 is a lower layer of PLCP sub-layer, supporting transmission and reception of a physical layer entity between two STAs through a wireless medium. The MPDU transmitted by the MAC sub-layer 30 is called a physical service data unit (PSDU) in the PLCP sub-layer 20.

The PLCP sub-layer 20, while receiving a PSDU from the MAC sub-layer 30 and forwarding the PSDU to the PMD sub-layer 10, attaches an additional field including information necessary for a physical layer transmitter and receiver. The additional field may correspond to tail bits used for restoring a PLCP preamble, a PLCP header, and a convolution encoder to zero state. The PLCP sub-layer 20 receives, from the MAC sub-layer, control information necessary for generating and transmitting a PLCP protocol data unit (PPDU); and a TXVECTOR parameter including control information necessary for a receiving STA to receive and interpret the PPDU. The PLCP sub-layer 20 may use information included in the TXVECTOR parameter to generate a PPDU including a PSDU.

The PLCP preamble is used to make a receiver perform a synchronization function and prepare antenna diversity before a PSDU is transmitted. A data field includes, in a PSDU, padding bits, a service field including a bit sequence for initializing a scrambler, and a coded sequence into which a bit sequence with appended tail bits is encoded. At this time, either binary convolutional coding (BCC) encoding or low density parity check (LDPC) encoding can be employed depending on the encoding method supported by an STA receiving the PPDU. In the PLCP header, a field for information about a PPDU to be transmitted is included, which will be described more specifically with reference to FIG. 5.

The PLCP sub-layer 20 generates a PPDU by adding the aforementioned field to a PSDU and transmits the PSDU to a receiving station through the PMD sub-layer; the receiving station receives the PPDU and restores data by obtaining information necessary for restoring data from the PLCP preamble and the PLCP header. The PLCP sub-layer of the receiving station forwards an RXVECTOR parameter including control information included in the PLCP preamble and the PLCP header to the MAC sub-layer and enables the MAC sub-layer to interpret the PPDU and obtain data while the MAC sub-layer is in a receiving mode.

FIG. 4 is an operating procedure illustrating an authentication and an association procedure of a station in a WLAN system shown in FIGS. 1 and 2 or in a wireless communication system including the WLAN system. An operating procedure between a first STA 2 and a second STA 4 illustrated in FIG. 4 may coincide with the procedure carried out between a non-AP STA and an AP constituting an infrastructure BSS; it should be clearly understood that the present embodiment is not limited only to the above. For example, the present embodiment can be applied the same or equally to operation among non-AP STAs constituting IBSS, operation among mesh points (MPs) constituting a mesh network system, operation among terminals forming a different wireless communication system, and operation between a terminal and a base station unless the application is prohibited due to its inherent characteristics.

Referring to FIG. 4, a radio measurement procedure in a wireless communication system according to an embodiment of the present invention further comprises, as a preliminary procedure of the radio measurement, a scanning procedure S10, an authentication procedure S20, and/or an association procedure S30; and further comprises a management procedure S40 which is performed after the preliminary procedures S10 to S30. According to one aspect of the embodiment of the present invention, at least part of the preliminary procedures may comprise arbitrary procedures rather than mandatory ones.

Referring to FIG. 4, the scanning procedure S10 is first performed between the first STA 2 and the second STA 4. The scanning procedure S10 is a procedure for the first STA 2 to search for a candidate station to be associated with the first STA 2 in the association procedure S30, which may correspond to a procedure for a non-AP STA to search for an AP in the infrastructure BSS, for example. However, a scanning procedure S10 in a broader sense may also include a procedure for a non-AP STA to search for a nearby non-AP STA in the IBSS or a procedure for an MP to search for a nearby MP in a mesh network.

The scanning procedure can be classified into two types. One is a passive scanning method using a beacon frame transmitted from APs including the second STA 4. In this method, the first STA 2 which attempts to access a wireless LAN can search for an accessible BSS by receiving beacon frames periodically transmitted from the second STA 4 which is an AP managing the corresponding BSS (or IBSS). The passive scanning method can be applied to the case when the second STA 4 corresponds to an AP transmitting beacon frames.

The other is an active scanning method. In this method, the first STA 2 attempting to access a wireless LAN system first transmits a probe request frame. The second STA 4 having received the probe request frame, i.e., an AP, transmits a probe response frame including a service set ID (SSID) of the BSS managed by the AP and capability information of the AP. Accordingly, the first STA 2 can know existence of a candidate AP and a variety of information on the candidate AP from the probe response frame received.

In the scanning procedure S10, a beacon frame or a probe response frame may include capability information of the second STA 4 which transmits the beacon or the probe response frame. The capability information may include information about whether a particular function/service (e.g., MU-MIMO transmission, the following link adaptation procedure according to the present invention, etc.) of the second STA 4 is supported.

Referring to FIG. 3, the authentication procedure S20 is performed between the first STA 2 and the second STA 4. The authentication procedure S20 is a procedure for negotiating an authentication process and an encoding method between entities participating in a wireless communication. For example, the first STA 2 can perform the authentication procedure S20 on the second STA for association, e.g., an AP, from among one or more APs found from the scanning procedure S10. When an open system authentication method is used, the second STA 4 performs the authentication process unconditionally in response to an authentication request from the first STA 2. A reinforced authentication method includes EAP-TLS (Extensible Authentication Protocol-Transport Layer Security), EAP-TTLS (Extensible Authentication Protocol-Tunneled Transport Layer Security), EAP-FAST (Extensible Authentication Protocol-Flexible Authentication via Secure Tunneling), and PEAP (Protected Extensible Authentication Protocol) based on the IEEE 802.1x standard.

When the authentication is successfully completed in the authentication procedure S20, the first STA 2 performs the association procedure S30. The association procedure S30 may be an arbitrary procedure which is performed when the first STA 2 is a non-AP STA and the second STA 4 is an AP. The association procedure S30 is intended to establish an identifiable link, that is, a wireless link, between the first STA 2 and the second STA 4. In the association procedure S30, the first STA 2 transmits an association request frame to the second STA 4 having successfully completed the authentication procedure S20 and the second STA 4 transmits to the first STA 2 an association response frame having a state value of "successful" in response to the association request frame. The association response frame includes an identifier for identifying the association with the first STA 2, for example, an association ID (AID).

If a connection state between the first STA 2 and the second STA 4 is degraded due to varying channel conditions after the association procedure S30 is successfully completed, the first STA 2 can initiate the association procedure with another accessible AP again, which is called a re-association procedure. The re-association procedure is very similar to the above-mentioned association procedure S30. More specifically, in the re-association procedure, the first STA 2 transmits a re-association request frame to a different AP (an AP having successfully completed the authentication procedure S20 among the candidate APs found in the scanning procedure S10) other than the AP currently associated therewith and the different AP transmits a re-association response frame to the first STA 2. However, the re-association request frame further includes information about the AP of previous association and the reassociated AP can transmit data buffered in the second STA 4 (which is the AP of previous association) using the information.

After the authentication and the association have been completed between the first STA 2 and the second STA 4 through the procedures shown in FIG. 4, transmission/reception of wireless frames can be carried out between the first STA 2 and the second STA 4. An STA attempting to transmit wireless frames can transmit the wireless frames to its destination STA by obtaining a transmission opportunity through a channel access method defined in the IEEE 802.11 standard.

To obtain higher throughput in a WLAN system, an MU-MIMO transmission method can be employed, where multiple STAs equipped with multiple antennas transmit or receive independent data streams simultaneously through the same channel. In what follows, an AP's transmitting a PPDU (physical layer convergence procedure (PLCP) protocol data unit) to multiple destination STAs through the MU-MIMO transmission method is called downlink (DL) MU-MIMO while a PPDU carrying independent PDSUs (PLCP service data units) for one or more STAs by using the MU-MIMO transmission method is called a MU-PPDU.

Transmission of additional control information may be needed for a WLAN system to support MU-MIMO transmission. Therefore, a WLAN system supporting the MU-MIMO transmission can employ a new PLCP frame format. FIG. 5 illustrates one example of a PLCP frame format which can be used for a WLAN system supporting MU-MIMO transmission.

The PPDU 500 of FIG. 5 can include L-STF 510, L-LTF 520, L-SIG field 530, VHT-SIGA field 540, VHT-STF 550, VHT-LTF 560, VHT-SIGB field 570, and data field 580.

The PLCP sub-layer constituting the PHY adds necessary information to a PSDU received from the MAC layer and converts the PSDU into a data field 580; the PLCP sub-layer generates a PPDU 500 by adding such fields as L-STF 510, L-LTF 520, L-SIG field 530, VHT-SIGA field 540, VHT-STF 550, VHT-LTF 560, and VHT-SIGB 570 into the data field 580 and transmits the PPDU 500 to one or more STAs through the PMD sub-layer. Control information used for the PLCP sub-layer to generate PPDU; and control information transmitted being included in the PPDU and used for a receiving STA to interpret the PPDU can be provided by TXVECTOR parameters received from the MAC layer.

L-STF 510 is used for frame timing acquisition, automatic gain control (AGC) convergence, etc.

L-LTF 520 is used for channel estimation for demodulation of the L-SIG field 530 and the VHT-SIGA field 540.

L-SIG field 530 is used for L-STA to receive the PPDU 500 and obtain data by interpreting the PPDU 500. The L-SIG field 530 includes a rate sub-field, a length sub-field, a parity bit, and a tail field. The rate sub-field holds a value indicating a bit rate of data to be transmitted.

The length sub-field holds a value indicating the octet length of a PSDU which is requested for transmission from the MAC layer to the PHY layer. At this time, L_LENGTH parameter related to the information of octet length of the PSDU is determined based on TXTIME parameter which is related to transmission time. TXTIME denotes transmission time determined by the PHY layer for transmission of a PPDU including a PSDU in response to the transmission time requested by the MAC layer for transmission of the PSDU. Therefore, since L_LENGTH parameter is a parameter related to time, the length sub-field included in the L-SIG field 530 includes information related to transmission time.

VHT-SIGA field 540 includes control information (or signal information) needed for STAs receiving a PPDU to interpret the PPDU. The VHT-SIGA field 540 can be transmitted as two OFDM symbols (VHT-SIG A1, VHT-SIG A2). VHT-SIG A1 includes bandwidth information of a channel used for PPDU transmission, identifying information about whether space time block coding (STBC) is used, information specifying a method of transmitting a PPDU between SU or MU-MIMO, information specifying an AP and a group of destination STAs for MU-MIMO transmission in the case when the transmission method is determined to be MU-MIMO, and information about spatial streams allocated to the respective STAs included in the group of destination STAs for MU-MIMO transmission.

Information specifying a method of MIMO transmission and information specifying a group of destination STAs for transmission can be implemented by one of MIMO specification information, which can be implemented in the form of a group ID, for example. The group ID can be chosen to have a value spanning a particular range; particular values of the range requires an SU-MIMO transmission method, whereas the remaining values can be used as identifiers for a group of destination STAs for the corresponding transmission in the case when the PPDU 500 is transmitted by using MU-MIMO transmission method.

If a group ID indicates that the corresponding PPDU 500 is transmitted through the SU-MIMO transmission method, VHT-SIGA2 includes coding indicator information showing whether a coding method applied to the data field is binary convolution coding (BCC) or low density parity check (LDPC) coding; and modulation coding scheme (MCS) information about a channel between a transmitter and a receiver. Also, the VHT-SIGA2 field can include a partial AID which includes the AID of a destination STA for PPDU transmission and/or a partial bit sequence of the AID.

If a group ID indicates that the corresponding PPDU 500 is transmitted through the MU-MIMO transmission method, VHT-SIGA field 540 includes coding indicator information showing whether a coding method applied to the data field for transmission is BCC or LDPC coding. In this case, modulation coding scheme (MCS) information about each destination STA can be included in the VHT-SIGB field 570.

VHT-STF 550 is used to improve performance of AGC estimation during MIMO transmission. Meanwhile, whereas L-STF field 510 to VHT-SIG A field 540 are transmitted without application of a pre-coding matrix ($Q_k$), the pre-coding matrix is applied (by beam-forming) to VHT-LTFs 560, VHT-SIG B 570, and data field 580, which are then transmitted to the respective STAs in the form of spatial streams independent from each other. VHT-STF 550 is transmitted between VHT-SIG A 540 and VHT-LTFs 560 in order for a receiving STA to accommodate a sudden change of transmission power due to the change of a transmission method (beam-forming transmission according to the application of the pre-coding matrix (Q)).

VHT-LTFs 560 is used for an STA to estimate a MIMO channel. During MU-MIMO transmission, VHT-LTFs 560 can be used as many as the number of spatial streams through which a PPDU 500 is transmitted. In addition, full channel sounding is supported and if the full channel sounding is performed, the number of VHT-LTFs may be increased more.

VHT-SIG B field 570 includes control information dedicated for each of destination STAs necessary for receiving a PPDU 500 and obtaining data during MU-MIMO transmission. Therefore, an STA can be designed to decode VHT-SIGB field 570 only when the common control information included in VHT-SIG A field 540 indicates that a currently received PPDU 500 has been transmitted through MU-MIMO transmission. On the other hand, if the common control information indicates that a currently received PPDU 500 is intended for a single STA (including SU-MIMO), an STA can be designed not to decode VHT-SIGB field 570.

VHT-SIGB field 570 includes information about modulation and coding scheme (MCS) and information about rate matching of the respective STAs. Also, VHT-SIGB field 570 includes information specifying the length of a PSDU included in the data field for each of the STAs. The information specifying the length of a PSDU corresponds to the information specifying the length of a bit sequence of a PSDU and can be specified in units of octet. The size of VHT-SIGB field 570 can be varied according to the type of MIMO transmission (MU-MIMO or SU-MIMO) and the bandwidth of a channel used for PPDU transmission.

Data field 580 includes data to be transmitted to a destination STA. The data field 580 can include a service field for initializing a PSDU (PLCP Service Data Unit) to which an MPDU (MAC Protocol Data Unit) in the MAC layer is transmitted and a scrambler, a tail field including a bit sequence necessary for restoring a convolution encoder to zero state; and a padding bits for normalizing the length of a data field.

In MIMO transmission where data are transmitted through multiple spatial streams independent from each other, the respective spatial streams can experience different channel environments from each other. To improve throughput, more exact information about a channel environment through which each spatial environment passes is needed; it is preferable to determine a MCS (Modulation and Coding Scheme) value relevant for the corresponding channel environment and use the determined MCS value for data modulation and coding. Therefore, a sounding procedure for obtaining channel information and a link adaptation procedure for determining a relevant MCS value can be performed in addition before or after data transmission.

By the way, an open loop link adaptation method using ACK has a disadvantage that it does not fully utilize information of a current channel during data transmission and reception. To overcome the disadvantage and thus improve system throughput, the present invention provides a link adaptation method capable of supporting closed loop link adaptation which transmits more exact information about a channel to an AP. A link adaptation procedure in a WLAN system supporting MU-MIMO transmission can be realized by using a PPDU or by using a null data packet (NDP).

FIG. 6 illustrates a link adaptation method based on a normal PPDU including data.

An AP can obtain a beam-forming matrix relevant for transmission to each STA by utilizing information obtained through a sounding procedure for the previous channel. Therefore, an AP can transmit a pre-coded PPDU where an MCS request (MRQ) is set for destination STAs of MU-MIMO transmission.

For link adaptation, each STA should perform channel estimation. Channel estimation can be performed by using PLCP preamble (VHT-LTFs) of a transmitted PPDU. Since data units are aggregated and transmitted in the data transmission of using a PPDU, reception checking of an STA about PPDU transmission can be performed in the form of block ACK (BA) frame. An STA can transmit data by including MCS feedback (MFB) information in the BA frame.

An AP, to request an MCS on each STA, can set the MRQ (MCS request) sub-field included in the MAC header of a PSDU transmitted to each STA to be '1'. In this case, since NDP (Null Data Packet) is not used, a NDP announcement sub-field is set to be '0'. The configuration above can be reflected in the HT control field of the MAC header which constitutes a PSDU being transmitted to each STA and thus transmitted. In the case of a WLAN system using a format frame not including the HT control field, the HT control field can be transmitted in the form of a control wrapper frame.

Each STA can include MFB information related to a channel estimation result in the HT control field of the control wrapper frame including the BA frame and thus transmit the MFB information to an AP.

In the example of FIG. 6, when an AP has transmitted a PPDU in the format as shown in FIG. 7 to STAs, a group ID in the VHT-SIGA field includes information illustrating which STAs the AP is involved with for data transmission. Now, it is assumed that STA1, STA2, STA3, and STA4 are included in a destination STA group and (3, 2, 1, 1) spatial streams are allocated for the respective STAs.

In this example, a total of seven streams are used; but, channel estimation of a receiver requires eight LTFs. A legacy preamble (L-STF, L-LTF) for a legacy STA not supporting MIMO transmission and VHT-SIGA field are transmitted as a single spatial stream through all of the transmission antennas. Those fields below the VHT-STF field is transmitted after application of pre-coding based on cyclic shift delay (CSD) and a pre-coding matrix Qk.

Each destination STA obtains data through a decoding process and transmits a BA frame to an AP, indicating that data have been received successfully. Under an assumption that data are received through a spatial stream allocated to each STA based on channel information estimated from LTF, estimated MCS information is included in the BA frame and thus transmitted. At the time of estimating MCS, the MCS can be estimated by taking account of the interference that may be caused by spatial streams allocated to an STA.

According to the configuration of group IDs, STA1 can transmit MFB (MCS Feedback) by including the MFB in the BA frame. Afterwards, if an AP transmits a block ACK request (BAR) to a particular STA, the corresponding STA can transmit the MFB by including the MFB in the BA frame.

FIG. 8 illustrates a link adaptation method based on NDP.

Referring to FIG. 8, an AP transmits an NDP to each STA. An NDP is a frame used by a receiving STA for channel estimation; an NDP follows the format of a PPDU excluding the data field. As in the case of receiving a PPDU, if an NDP is received, STAs can perform channel estimation based on LTF included in the NDP. An AP, by transmitting an NDPA (NDP announcement) before transmitting an NDP, can inform that an NDP will be transmitted subsequently.

FIG. 9 is a block diagram illustrating a format of an NDPA frame.

An NDPA frame 900 includes a frame control field 910, a duration field 920, a receiver address (RA) field 930, a transmitter address (TA) field 940, a sounding sequence field 950, at least one or more STA information fields 960, and a frame check sequence (FCS) field 970. The frame control field 910 includes control information related to the NDPA frame 900. The duration field 920 specifies the length of the NDPA frame 900. The RA field 930 specifies the address of a receiving STA of the NDPA frame 900, which may be a broadcast address. The TA field 940 specifies the address of an AP and/or an STA transmitting the NDPA frame 900. The sounding sequence field 950 includes the number of sounding sequences to be included currently. The STA information field 960 includes information for identifying a destination STA for channel sounding and information about feedback information according to the channel sounding. If the number of STAs for channel sounding is one or more, one or more STA information fields 960 can be included in the NDPA frame 900.

Again referring to FIG. 8, an NDPA frame is a control frame used for performing a channel sounding procedure through NDP transmission. Therefore, since an NDPA frame itself does not include a HT control field, an MRQ through configuring the HT control field cannot be included in the NDPA frame. However, since an STA provides information for MCS estimation through the NDPA frame and channel estimation is possible through an NDP, a link adaptation method based on the NDPA frame and NDP is also possible. Therefore, a method of transmitting an NDPA frame by including the NDPA frame in a control wrapper frame is provided so that an MRQ is triggered through NDPA frame transmission. Configuring an MRQ can be realized by configuring a HT control field included in a control wrapper frame.

The HT control field of a control wrapper frame including an NDPA frame is configured for MRQ and NDP notification. Also, information about NDP transmitted to each STA should be included. A group ID in the VHT-SIGA field of a PPDU includes information about a group of destination STAs for MU-MIMO transmission through an AP and each STA can obtain information specifying the number of spatial streams from a PPDU received through unicast and/or broadcast transmission.

Configuration of MRQ and NDP notification can be realized by setting up a link adaptation sub-field and an NDP notification sub-field of the HT control field.

Meanwhile, an NDP includes in itself a group ID and a VHT-SIGA field including spatial stream allocation information. However, a group ID of an NDP is predefined to indicate SU transmission. Therefore, information that can be obtained through VHT-SIGA field of an NDP is information about spatial stream allocation and MCS.

On the other hand, as described above, information related to MCS, which has been applied to each spatial stream, can be realized differently according to a value assigned to the group ID. Therefore, in the case of an NDP, information related to MCS is made to accept a setting applied for MU transmission irrespective of a group ID. Thus, an STA can obtain information related to MCS through interpretation of the VHT-SIGB field.

An STA can know based on a unicast or broadcast PPDU how the STA is involved in the transmission to and from an AP, if the number of spatial streams for a PPDU and the number of spatial stream for an NDP are the same with each other, the STA can obtain information about the number of spatial streams allocated to itself. Also, from the VHT-SIGB field of an NDP, MCS information applied to each spatial stream can be obtained. Based on the MCS information above, each STA can estimate an optimal MCS by taking account of spatial streams allocated to other STAs and transmit MFB information to an AP based on the AP polling method. Each STA transmits spatial streams and MCS information obtained to a feedback frame including a HT control field. At this time, since the link adaptation method is a method based on 'the NDPA frame—NDP', a feedback frame can correspond to a VHT beam-forming compressed frame and further include channel state information (CSI) according to channel sounding.

An AP receives CSI and all of the MFB information available from STAs through a link adaptation procedure. The MFB information specifies an MCS deemed to be optimal for the number of spatial streams by the respective STAs. An AP, after obtaining information from each STA, can select an MCS based on the information obtained to determine whether to make a system processing rate highest at the next transmission or whether to allocate spatial streams to each STA as fairly as can be possible by taking account of fairness among STAs.

In the example of FIG. 8, it is assumed that the number of spatial streams that can be transmitted by an AP is 8 and the number of spatial streams available is (4, 3, 2, 1). An AP may not be able to handle the requirements from all of the STAs. However, it is determined that MU-MIMO transmission is more advantageous than SU-MIMO transmission in terms of throughput of the entire system; and it is also determined that spatial streams are allocated evenly for each STA.

Meanwhile, when STAs perform MCS estimation and provide feedback. MCS feedback is performed based on SU-MIMO transmission; at the same time, MCS feedback can be performed under the assumption that MU-MIMO transmission is employed. Here, providing feedback based on MU-MIMO transmission may be considered to be providing feedback based on an assumption that the number of spatial streams and transmission power are limited by a different constraint from the case of SU-MIMO transmission.

FIG. 10 is another example of link adaptation. In this example, it is assumed that the number of MU-MIMO paired STAs with an AP is three and no change in the channels occurs.

An AP transmits a PPDU to STA1, STA2, and STA3 through MU-MIMO transmission method S1010. Transmission of a PPDU can be performed based on the previous result of channel sounding.

Afterwards, a situation may occur such that the AP has no more data to be transmitted to STA3 or connection to STA3 is terminated S1020.

The AP can allocate additional radio resources obtained from termination of STA3 to the existing STA1 and STA2. Since no change in the channels is expected, it is not necessary to use a new channel sounding procedure for calculating a new pre-coding matrix for re-allocation of radio resources.

The AP initiates a link adaptation procedure for STA1 and STA2. The AP transmits a PPDU including a HT control field which configures MRQ to STA1 and STA2 S1030.

STA1 and STA2 estimate a channel and MCS based on VHT-LTF of a PPDU and provide feedback MFB information for an AP S1040. MFB information feedback of destination STAs in the MU-MIMO transmission can be performed through polling by a BA frame and a BA request (BAR).

The AP carries out data transmission based on a new MCS obtained in the above procedure S1050.

In a link adaptation method shown in the examples of FIGS. 6, 8, and 10, a considerable overhead occurs for providing and receiving MCS feedback. For example, an MCS feedback method using an NDP generates as much overhead as the sum of NDPA, SIFS, and NDP. To reduce overhead occurred from a link adaptation method, according to an embodiment of the present invention, a smaller packet is employed or a link adaptation procedure is carried out only for part of MU-MIMO paired STAs. In what follows, a link adaptation method according to the present invention to reduce overhead occurred from applying a link adaptation method will be described along with an accompanying embodiment.

FIG. 11 is an example illustrating that overhead can be increased when a conventional link adaptation method is employed.

In a conventional link adaptation method, though only MCS feedback of a particular STA is needed, MCS feedback of all of the STAs should be received sequentially. The example of FIG. 11 shows that an AP performs a link adaptation procedure for STA1, STA2, STA3, and STA4, which are destination STAs of MU-MIMO transmission. At this time, in the case when the AP wants to receive MCS feedback of STA3 and STA4, according to a conventional procedure, the AP receives MCS feedback 1115 of STA1 and transmits an MCS poll frame 1102 requesting MCS feedback transmission on STA2 and again receives MCS feedback 1125 of STA2. However, MCS feedback 1115, 1125, which come from STA1 and STA2 other than an STA from which the AP wants to receive MCS feedback, are in fact unnecessary, increasing overhead. For efficient utilization of radio resources, it is preferable to remove unnecessary S1150 step and allow the AP to receive MCS feedback only from the STA from which the AP wants to receive MCS feedback. In what follows, an STA-selective link adaptation method according to the present invention will be described along with various embodiments.

A link adaptation method according to one embodiment of the present invention requests MCS feedback on part of destination STAs for MU-MIMO transmission by using SU-MIMO packets and allows receiving MCS feedback from the part of destination STAs. Although the present embodiment relates to a link adaptation procedure intended for part of destination STA(s) for MU-MIMO transmission, an MCS value (a recommended MCS value included in the MCS feedback) estimated by an STA through the present link adaptation procedure is calculated under an assumption that the corresponding STA receives MU-MIMO transmission. In other words, part of STAs transmitting MCS feedback calculates a recommended MCS value assuming a situation where actual MU-MIMO transmission is carried out and transmits MCS feedback to the destination STAs for MU-MIMO transmission.

According to an embodiment of the present invention, an AP initiating a link adaptation procedure transmits SU-MIMO packets including an MCS request message. At this time, included in an SU-MIMO packet are information $N_{LTFs}$ specifying the number of VHT-LTFs for estimating a channel for spatial streams included in the SU-MIMO packet and information $N_{SSd}$ specifying a spatial stream through which data are transmitted. For example, $N_{LTFs}$ and $N_{SSd}$ can be transmitted being included in the VHT-SIG field which carries control information indicating the structure of a SU-MIMO packet. At this time, $N_{LTFs}$ and $N_{SSd}$ can be set up independently of each other. $N_{LTFs}$ and $N_{SSd}$ can have values different from each other.

FIG. 12 illustrates one example of a SU-MIMO packet which can be used for a link adaptation procedure according to one embodiment of the present invention. The example of FIG. 12 corresponds to a case where $N_{LTFs}$ and $N_{SSd}$ are transmitted being included in the VHT-SIG-A field. $N_{LTFs}$ and $N_{SSd}$ included in the VHT-SIG-A field as part of control information can be set up independently of each other and can have different values from each other as described above.

FIG. 13 illustrates a link adaptation procedure according to one embodiment of the present invention.

An AP transmits a data frame to STA1, STA2, STA3, and STA4, which are destination STAs of MU-MIMO transmission. At this time, if it is assumed that the AP requests MCS feedback on STA3, the AP transmits an MCS request. The MCS request (MRQ) is transmitted through an SU-MIMO packet. A group ID of VHT-SIG A field of an SU-MIMO packet is set to have a value indicating SU-MIMO transmission. Also, $N_{LTFs}$ and $N_{SSd}$ are included, where $N_{LTFs}$ is set to be 8 and $N_{SSd}$ is set to be 2, the number of spatial streams transmitted to STA3. In other words, an SU-MIMO packet includes eight VHT-LTFs and the STA3, among eight spatial streams, decodes only those spatial streams allocated to its data spatial streams. The STA3 can calculate a recommend MCS under a situation the same as that where a data frame is transmitted to STA1, STA2, STA3, and STA4 through MU-MIMO transmission; and provide the calculated MCS for the AP as feedback.

Afterwards, when the AP transmits a data frame to STA1, STA2, STA3, and STA4 through MU-MIMO transmission, the AP can apply the MCS value (which has been determined with reference to the recommend MCS received as feedback from the STA3) for the data to be transmitted to the STA3.

An STA-selective link adaptation method according to the present embodiment provides an advantage such that the link adaptation procedure for MU-MIMO transmission can be carried out only for particular STAs. Also, since a different number of spatial streams from the number of VHT-LTFs can be used for transmission of a data area, an interference level can be calculated when channel estimation is performed. The link adaptation procedure, in addition to the link adaption, can provide a method for figuring out which STA experiences which channel suffering interference.

An STA-selective link adaptation method according to another embodiment of the present invention can utilize MU-PPDU. In the present embodiment, among destination STAs of MU-MIMO transmission, link adaption for one STA can be carried out by using MU-PPDU. In the same way as the link adaptation method using an SU-MIMO packet described above, a link adaptation procedure is performed only for part of STAs; however, a recommended MCS value included in the MCS feedback of part of STAs is calculated as a recommend MCS value under an MU-MIMO transmission environment.

FIG. 14 illustrates an MU-PPDU which can be used for a link adaptation method according to an embodiment of the present invention.

According to the present embodiment, information indicating an STA for which MCS feedback is provided can be included in a MAC header included in a PSDU which can be obtained by decoding a data field of an MU-PPDU. In what follows, it is assumed that a MAC header included in a data field of a PPDU denotes a MAC header in an MPDU included in a procedure of generating the data field of the PPDU. An AP includes an MCS request (MRQ) message in a data field transmitted to a particular STA which requires MCS feedback and transmits the data field. The MRQ message can be transmitted being included in a MAC header included in the data field. In other words, the AP can request MCS feedback on a particular STA through configuring MRQ bit of the MAC header. On the other hand, by transmitting a null data frame (such as NDP, EOF, QoS-Null packet, etc.) to the STAs not requested for MCS feedback, it can be made not to perform transmission of MCS feedback.

FIG. 15 illustrates an STA-selective link adaptive method by using an MU-PPDU according to an embodiment of the present invention.

The example of FIG. 15 assumes a situation where an AP performs MU-MIMO transmission to STA1, STA2, STA3, and STA4; and two spatial streams are allocated for each STA. The AP attempts to obtain MCS feedback from STA3. An MCS request transmitted to request MCS feedback only from the STA3 can be transmitted being included in a MAC header of a data field of an MU-PPDU. In the example of FIG. 15, since the AP makes a request of MCS feedback only on the STA3, an MRQ message is included in the data field 1530 transmitted over a spatial stream to the STA3. At this time, MRQ is not included in the data transmitted over spatial streams to STAs not requested for MCS feedback (STA1, STA2, and STA3) or a data packet is not transmitted to the data. The STA3 decodes a data field transmitted over a spatial stream allocated to the STA3 itself and checks an MRQ message and calculates recommended MCS value and transmits MCS feedback 1540. Afterwards, when the AP performs MU-MIMO transmission to STA1, STA2, STA3, and STA4, MCS determined based on a recommended MCS value included in the MCS feedback 1540 can be applied to the data 1550 to be transmitted to the STA3.

As shown in the example of FIG. 15, when an STA-selective link adaptation method of the present invention is carried out by using an MU-PPDU, in addition to the advantage of the STA-selective link adaptation method of FIG. 13 based on an SU-MIMO packet, an additional advantage can be obtained that it is not necessary to adjust/change information included in the VHT-SIG A field.

FIG. 16 illustrates another example of an STA-selective link adaptation procedure.

An AP trying to commence a link adaptation procedure can use a frame including only EOF instead of NDP. The AP transmits meaningless null data over spatial streams allocated to STAs (STA1, STA2, and STA4) not requested for MCS feedback. At this time, for transmission of null data, an end of frame (EOF) delimiter of A (aggregation)-MDPU can be employed. In another example of transmission of null data, QoS-null packet can be transmitted. STAs reading null data can figure out that no data have been assigned to be transmitted to them and do not provide MCS feedback as well as a block ACK. On the other hand, the STA3 can decode data transmitted over a spatial stream allocated to the STA3 itself and check an MRQ message and transmit MCS feedback. At this time, MCS feedback can be transmitted along with a block ACK.

In another example of an STA-selective link adaptation method using an MU-PPDU, an RA field in a MAC header belonging to a data area transmitted to each STA is filled with a garbage value. In other words, an AP fills the RA field of a MAC header included in a data field transmitted over spatial streams to STAs not requested for MCS feedback with garbage values. STAs decode data transmitted over spatial streams allocated to them for MU-MIMO transmission; and STAs having read the garbage values of the RA field does not provide MCS feedback, whereas only those STAs having read valid values from the RA field provide MCS feedback.

According to another embodiment of the present invention, when MCS feedback is requested on part of destination STAs for MU-MIMO transmission, information indicating a destination STA for requesting MCS feedback and information indicating the transmission order of the MCS feedback can be transmitted in various ways.

As an example of indicating destination STAs on which MCS feedback is requested, destination STAs for MCS feedback can be indicated in the form of a bitmap in a MAC header included in a data field transmitted to the destination STAs of an MCS feedback request.

FIG. 17 illustrates one example of a method for indicating destination STAs of an MCS feedback request according to an embodiment of the present invention.

When an AP transmits an MU-PPDU 1700 to destination STAs (STA1, STA2, STA3, and STA4) of MU-MIMO transmission, a MAC header is included in a data field of the MU-PPDU. At this time, the MAC header includes an MCS feedback indication field 1750 indicating destination STAs of an MCS feedback request. In the example of FIG. 17, the MCS feedback indication field 1750 can indicate the destination STAs of an MCS feedback request in the form of a bitmap. For example, if the AP requests MCS feedback on STA3 and STA4, b0 and b1 bit are set to be 0; b2 and b3 bit are set to be 1; and thus the MCS feedback is transmitted. STA1, STA2, STA3, and STA4 receive MU-PPDU 1700 and decode the data field and check the MCS feedback indication field 1750 and figure out whether they are the target of an MCS feedback request. An STA for which the corresponding bit is set to be 1 can transmit MCS feedback.

In addition, an indicator indicating whether to transmit MCS feedback immediately can be included further in a MAC header, which is illustrated in FIG. 18. As one specific embodiment, whether to provide MCS feedback immediately can be indicated by one bit in a HT control field at VHT mode of a MAC header.

FIG. 19 illustrates one example of an STA-selective link adaptation method according to another embodiment of the present invention.

An AP transmits an MU-PPDU 1900 to STA1, STA2, STA3, and STA4. However, the AP makes an MCS feedback request only on STA3 and STA4 among STA1, STA2, STA3, and STA4. At this time, in a MAC header of a data field transmitted to each STA, it is indicated in the form of a bitmap that STA3 and STA4 correspond to the target of an MCS feedback request, STA1 and STA2 get to know from the bitmap field of a MAC header that they are not the target of an MCS feedback request. In the same way, STA3 and STA4 get to know that they are the target of the MCS feedback request. Therefore, first, STA3 transmits MCS feedback and STA4 provides MCS feedback after receiving an MCS poll. A poll frame with which an AP requests MCS feedback on an STA sequentially and a method for transmitting MCS feedback of an STA will be described later.

FIGS. 20 and 21 illustrate one example of an STA-selective link adaptation method according to another embodiment of the present invention.

In the example of FIG. 20, an AP includes an indicator (which explicitly requests transmission of MCS feedback) in a MAC header of a data area transmitted to STA2 and transmits the indicator to the STA2; and the STA2, checking the indicator, provides MCS feedback immediately.

In the example of FIG. 21, the AP sets up an MCS request in the MAC header of a data field transmitted to STA3 and STA4; and thus transmits the data field. In addition, a bit is set up, directing the STA3 to immediately transmit MCS feedback. Accordingly, the STA3 and the STA4 transmit MCS feedback; the STA3 which have received a request for immediate transmission of MCS feedback transmits MCS feedback and then the STA4 can transmit MCS feedback according to a poll frame.

FIG. 22 illustrates a MAC frame format used for transmitting a data packet in a WLAN system. The MAC frame of FIG. 22 is included in an MPDU generated in a MAC layer and is converted into part of a data field of a PPDU again in the physical layer and the converted MAC frame is transmitted through a wireless medium (WM). The MAC frame includes a MAC header, a frame body, and a frame check sum (FCS) field.

In the address field of a MAC header, a receiver address (RA), a transmitter address (TA), a source address (SA), and a destination address (DA) can be configured. In the address field, a MAC address of an STA having a length of 6 octets is set up. FIG. 23 illustrates one example of setting up the address field.

The RA field contains an IEEE MAC individual or group address that identifies the intended immediate recipient STA(s), on the WM, for the information contained in the frame body field.

The TA field contains an IEEE MAC individual address that identifies the STA that has transmitted, onto the WM, the MPDU contained in the frame body field. The Individual/Group bit is always transmitted as a zero in the transmitter address.

The QoS control filed 2250 is a 16 bit field identifying a traffic category (TC) or a traffic stream (TS) of a frame including the QoS control field. The QoS control field includes QoS-related information of a frame including a QoS field varying according to a frame type and a frame sub-type. The QoS control field can indicate type of a frame including the QoS control field according to the corresponding set-up; Table 1 illustrates the example.

TABLE 1

| Applicable frame (sub) types | Bits 0-3 | Bit 4 | Bits 5-6 | Bit 7 | Bits 8 Bit 9 Bit 10 Bits 11-15 |
|---|---|---|---|---|---|
| QoS CF-Poll and QoS CF-Ack + CF-Poll frames sent by HC | TID | EOSP | Ack Policy | Reserved | TXOP Limit |
| QoS Data + CF-Poll and QoS Data + CF-Ack + CF-Poll frames sent by HC | TID | EOSP | Ack Policy | A-MSDU Present | TXOP Limit |
| QoS Data and QoS Data + CF-Ack frames sent by HC | TID | EOSP | Ack Policy | A-MSDU Present | AP PS Buffer State |
| QoS Null frames sent by HC | TID | EOSP | Ack Policy | Reserved | AP PS Buffer State |
| QoS Data and QoS Data + CF-Ack frames sent by non-AP STAs that are not a TPU buffer STA or a TPU sleep STA in a non-mesh BSS | TID | 0 | Ack Policy | A-MSDU Present | TXOP Duration Requested |
| | TID | 1 | Ack Policy | A-MSDU Present | Queue Size |
| QoS Null frames sent by non-AP STAs that are not a TPU buffer STA or a TPU sleep STA in a non-mesh BSS | TID | 0 | Ack Policy | Reserved | TXOP Duration Requested |
| | TID | 1 | Ack Policy | Reserved | Queue Size |
| QoS Data and QoS Data + CF-Ack frames sent by TPU buffer STAs in a non-mesh BSS | TID | EOSP | Ack Policy | A-MSDU Present | Reserved |
| QoS Null frames sent by TPU buffer STAs in a non-mesh BSS | TID | EOSP | Ack Policy | Reserved | Reserved |
| QoS Data and QoS Data + CF-Ack frames sent by TPU sleep STAs in a non-mesh BSS | TID | Reserved | Ack Policy | A-MSDU Present | Reserved |
| QoS Null frames sent by TPU sleep STAs in a non-mesh BSS | TID | Reserved | Ack Policy | Reserved | Reserved |

Bit 5, 6 of the QoS control field indicates ACK policy. According to the configuration of the two bits, four different types of ACK policy can be expressed. Table 2 illustrates ACK policy according to a setting of the ACK policy bits.

TABLE 2

| Bits in QoS Control field | | |
|---|---|---|
| Bit 5 | Bit 6 | Meaning |
| 0 | 0 | Normal Ack or Implicit Block Ack Request. |
| 1 | 0 | No Ack |
| 0 | 1 | No explicit acknowledgment or PSMP Ack. |
| 1 | 1 | Block Ack |

In an STA-selective link adaptation procedure described above, it has been described that an MU-PPDU can be employed. According to an embodiment of the present invention, to reduce overhead occurring from applying a link adaptation procedure, null data can be transmitted to the MU-PPDU.

In what follows, data-null denotes a MAC frame where 'type' sub-field 2210 of FIG. 22 is set to be 10 and 'subtype' sub-field 2220 is set to be 0100; data-QoS null denotes a MAC frame where 'type' sub-field 2210 of FIG. 22 is set to be 10 and 'subtype' sub-field 2220 is set to be 1100.

Even if data-null or data QoS null, which are empty data having no contents, are transmitted, an STA receiving the data-null or the data QoS null transmits an ACK frame according to an ACK policy, where the ACK policy in this case corresponds to normal ACK protocol. If the AP transmits null data to destination STAs for MU-MIMO transmission and makes a request of MCS feedback only on the part of the STAs, a problem may occur such that all the destination STAs for MU-MIMO transmission generate an immediate ACK. FIG. 24 illustrates a problem that can occur when multiple receiving STAs generate immediate ACKs simultaneously and transmit the immediate ACKs. Now, it is assumed that the AP transmits an MU-PPDU to STA1, STA2, and STA3. If data QoS null is transmitted to STA1, STA2, and STA3; and STA2 and STA3 are requested for MCS feedback, STA1, STA2, and STA3 transmit ACKs to the AP according to an ACK policy. At this time, STA2 and STA3 include an MFB in the ACK frame according to a request for MCS feedback. Since STA1, STA2, and STA3 have received data-QoS null, immediate ACKs are transmitted, generating conflict among them.

To solve the problem, an ACK policy is provided such that only the STA2 and the STA3 transmitting ACKs including MFB are made to transmit ACKs and STA1 is made not to transmit the ACK.

According to an embodiment of the present invention, in a situation as shown in FIG. 24. No ACK policy is set for STA1 not to transmit ACK while STA2 and STA3 transmitting ACK including MFB are configured to transmit ACK. ACK policy bits of a QoS control field in a MAC header included in a data field to be transmitted to the STA1 can be transmitted after being set to be 10.

As another example for the STA1 not to transmit ACK in the same situation as shown in FIG. 24, a receiver address of a MAC frame included in the data transmitted to the STA1 can be set to a meaningless value (e.g., all the digits are set to 1) rather than the MAC address of the STA1 or the receiver address can be set to a locally administered MAC address, MAC address of an AP, etc.

According to an embodiment of the present invention, to solve a problem where STA2 and STA3 collide with each other as they transmit immediate ACKs, a method of adjusting an ACK policy of a MAC frame included in a data field transmitted to the STA2 and the STA3 is provided. When collision of ACKs is anticipated, the collision can be avoided by performing transmission after setting ACK transmission policies to be different from each other. For example, if multiple STAs are supposed to transmit ACKs including MFB, an ACK policy for one STA can be set to immediate ACK while the ACK policy for the other STAs is set to Block ACK. The STA whose ACK policy has been set to immediate ACK transmits ACK including MFB immediately while each of the STAs for which ACK policy has been set to Block ACK waits for a block ACK request (BAR) transmitted to the STA itself and transmits ACKs including MFB.

FIG. 25 illustrates an embodiment of the present invention for preventing collision during ACK transmission by using the ACK policy described above.

An AP, by transmitting an MU-PPDU through MU-MIMO transmission to destination STAs of MU-MIMO transmission, which are STA1, STA2, and STA3, initiates an STA-selective link adaptation procedure. To reduce overhead in the link adaptation procedure, the AP transmits null data and requests MCS feedback only on the STA2 and STA3. At this time, since it is not necessary to receive ACK including MFB from the STA1, the ACK policy for the STA1 can be set to no ACK. Alternatively, the address filled in the RA field included in a MAC header of null data transmitted to the STA1 is set to the address of the AP or a meaningless value rather than the MAC address of the STA1. In order to avoid collision during ACK transmission of STA2 and STA3, the ACK policy for the STA2 is set to immediate ACK while the ACK policy for STA3 is set to block ACK. The STA2 transmits ACK including its MFB according to the immediate ACK policy while the STA3, according to the block ACK policy, receives a poll frame (BAR) and then transmits ACK.

So far, in an STA-selective link adaptation procedure according to an embodiment of the present invention, a method of configuring part of STAs to be destination STAs for MRQ and a method of receiving MCS feedback from multiple STAs have been described.

In what follows, at the time of receiving MCS feedback from multiple STAs, a poll frame requesting transmission of MCS feedback according to the present invention will be described.

FIG. 26 is a block diagram of one example of a format of a poll frame according to an embodiment of the present invention.

The poll frame 2600 of FIG. 26 builds on a block ACK request (BAR) frame. In other words, the poll frame 2600 uses the BAR frame defined in the IEEE 802.11n standard as an MCS FB frame, informing an STA implicitly about the transmission time point of MCS feedback. An RA field 2620 is included in the BAR frame 2600. Therefore, if an STA attempting to transmit MCS feedback receives a BAR frame where MAC address of the STA is configured to be a receiver address, the STA interprets the receiving of the BAR frame as the time for transmitting MCS feedback and provides the MCS feedback. The BAR frame according to an embodiment of the present invention can include an MCS poll indicator indicating that the corresponding BAR frame will be used as an MCS poll frame in a link adaptation procedure.

As an example of a method for transmitting an MCS poll indicator through an MCS poll frame, FIG. 26 illustrates a method which uses a BAR frame as an MCS poll frame and transmits an MCS poll indicator through a multi-TID field 2645 and a compressed bitmap field 2655 of the BAR frame. The multi-TID field 2645 and the compressed bitmap field 2655 of a conventional BAR frame specify block ACK type according to the original configuration. The IEEE 802.11n system defines the purpose of a block ACK request frame by using one bit of the multi-TID field 2645 and one bit of the compressed bitmap field 2655. It can be indicated that the BAR frame according to one embodiment of the present invention can be used as an MCS poll frame by setting the multi-TID field 2645 and the compressed bitmap field 2655. If an AP tries to inform a particular STA of transmission timing of MCS feedback, the AP can transmit a BAR frame where the multi-TID field 2645 is set to 1 and the compressed bitmap field 2655 is set to 0. If the STA receives from the AP a BAR frame where the multi-TID field 2645 has been set to 1 and the compressed bitmap field 2655 has been set to 0, the STA can transmit MCS feedback.

FIGS. 27 to 28 illustrate another embodiment of the present invention which uses a BAR frame as an MCS poll frame.

FIG. 27 illustrates an example of transmitting a BAR frame by newly defining an MCS polling sub-field 2710 in a BAR control field of the BAR frame and including an MCS poll indicator in an MCS polling sub-field. FIG. 28 illustrates an example of defining a polling information field 2810 including the MCS poll indicator in the BAR frame.

In the above description, a method of using a BAR frame in place of an MCS poll frame with reference to FIGS. 26 to 28. However, an MCS poll frame 2900 including polling information 2910 can also be defined. FIG. 29 illustrates one example of an MCS poll frame format according to the present invention.

FIG. 30 illustrates a method of transmitting MCS feedback sequentially by using an MCS poll frame.

In the example of FIG. 30, an AP requests MCS feedback on STA1 and STA2 and receives MCS feedback from the STA1 and the STA2. The AP transmits a QoS-null frame and an MCS request (MRQ) through MU-MIMO transmission. The QoS-null frame indicates that the STA1 corresponds to an STA which provides MCS feedback in the first place. The STA1, according to the indication, receives the QoS-null frame and the MRQ and transmits MCS feedback after SIFS. The AP receiving MCS FB of the STA1 transmits an MCS poll frame to the STA2 after SIFS. The MCS poll frame may have the format of FIGS. 26 to 29. At this time, the MCS poll frame is transmitted after the RA field is set to the MAC address of the STA2 and the MCS polling filed is set to 1. The STA2 receiving the MCS poll frame transmits MCS FB after SIFS.

According to another embodiment of the present invention, the MCS poll frame, aside from the explicit MCS feedback indication described above, can include a feedback type field indicating whether to use immediate feedback or delayed feedback at the time of transmitting MCS FB. In other words, the feedback type field may be considered as a field indicating whether to allow delayed feedback. The feedback type field consists of one bit and can specify immediate or delayed feedback according to its setup. FIG. 31 illustrates one example of an MCS poll frame including the feedback type field. The feedback type field can be transmitted being included in the MCS poll frame of FIGS. 26 to 29, where FIGS. 32 and 33 illustrate one example of the feedback type field.

FIG. 34 illustrates an embodiment of the present invention using an MCS poll frame including a feedback type field.

FIG. 34 assumes that an AP requests MCS feedback on STA1 and STA2. The AP transmits a QoS-null frame and an MCS request (MRQ) through MU-MIMO transmission. The QoS-null frame indicates that the STA corresponds to an STA which provides MCS feedback in the first place. The STA1, according to the indication, receives the QoS-null frame and the MRQ and transmits MCS feedback after SIFS. The AP receiving MCS FB of the STA1 transmits an MCS poll frame to the STA2 after SIFS. At this time, the MCS poll frame can be transmitted after the feedback type field is configured as delayed feedback. The STA2 checks the feedback type field of the MCS poll frame and transmits delayed feedback.

Meanwhile, at the time of transmitting MCS feedback request to STAs through the QoS-null frame, an STA can recognize from the values of a frame type field and a floating type field in the QoS null frame that a data frame transmitted to the STA itself is a QoS null frame. The STA can ignore a sequence control field transmitted subsequently. If an STA which has not read the sequence control field receives a BAR frame afterwards, a problem may occur in determining which information should be included in a BA frame for transmission and which sequence number the BA frame should be transmitted with. When STAs ignoring the sequence control field are obliged to transmit MCS FB in response to the BAR frame, MCS FB should be transmitted even if the sequence number is not known. According to an embodiment of the present invention, when the BAR frame is transmitted to the MCS poll frame, an MFB indicator directing transmitting an MRQ response is also transmitted being included in the BAR frame. FIG. 35 illustrates an MCS poll frame including an MFB indicator according to an embodiment of the present invention. The MCS poll frame including the MFB indicator of FIG. 35 is only an example and can also be applied to the MCS poll frame using the BAR frame described earlier. In the example of FIG. 35, the MFB indicator can be transmitted to a QoS null response request field.

If an AP transmits a QoS null frame and an MRQ and transmits a BAR frame to an MCS poll frame, the AP transmits an BAR frame which includes a MFB indicator requesting a response (MFB) of QoS null+MRQ. For example, if the AP tries to transmit the BAR frame after setting a QoS null response request field to 1, an STA transmits the QoS null response request field to a BA by also setting the field to 1. When the QoS null response request field is set to 1, it can be interpreted that the BAR frame provides BA-related information for an STA receiving the BAR frame and functions as an MCS poll frame rather than its original function of indicating BA transmission timing. In this case, generation/transmission of a BAR information field can be omitted. In the same way, if an STA receives a BAR frame whose QoS null response request field has been set to 1 and transmits a BA frame in response to the reception, the BA frame can function as a frame transmitting MCS feedback rather than its original function of transmitting block ACK. In this case, generation/transmission of a BA information field of the BA frame can be omitted.

FIG. 36 is a block diagram illustrating a wireless apparatus to which an embodiment of the present invention can be applied. The wireless apparatus can be an AP or an STA.

The wireless apparatus 70 includes a processor 72, a memory 74, and a transceiver 76. The transceiver 76 transmits and receives radio signals and physical layer of the IEEE 802.11 is implemented in the transceiver 76. The processor 72, being connected to the transceiver 76 functionally, implements the MAC layer and the physical layer of the IEEE 802.11. The processor 72 can be configured in such a way that it generates or transmits at least one of MCS poll frames according to the present invention; obtains control information by interpreting field values included in a received frame; and obtains data based on the control information. The processor 72, to support a link adaption method according to the present invention, can be configured in such a way that it calculates recommended MCS and provides the recommended MCS to an AP when a link adaptation procedure is started. The processor 72 can be configured to realize an embodiment of the present invention described with reference to FIGS. 11 to 35.

The processor 72 and/or the transceiver 76 can include application-specific integrated circuit (ASIC), other chipsets, logic circuits, and/or a data processing devices. The memory 74 can include read-only memory (ROM), random access memory (RAM), a flash memory, a memory card, a storage medium, and/or other storage devices. If the embodiment is implemented in software, the method described above can be realized in the form of a module (procedure, function, etc.) performing the aforementioned functions. The module can be stored in the memory 74 and can be executed by the processor 72. The memory 74 can be installed inside or outside of the processor 72 and can be connected to the processor 72 through various well-known means.

The preferred embodiments of the present invention described in detail above are only examples introduced for illustrating technical principles of the present invention. Therefore, it should not be interpreted that the technical principles of the present invention are limited to the embodiments. The technical scope of the present invention is defined by the appended claims of the present invention.

What is claimed is:

1. A method for a wireless local area network, the method comprising:
   receiving, by a responding station, a Multi User-Physical layer Protocol Data Unit (MU-PPDU) from a requesting station, the MU PPDU including a plurality of data frames destined for a plurality of receiving stations including the responding station,
   wherein one data frame of the plurality of data frames includes a Quality of Service (QoS) Null frame that includes an ACK policy field that identifies an ACK policy for the responding station, and
   wherein the QoS Null frame indicates that the responding station will firstly send an acknowledgement (ACK) frame among the plurality of receiving stations,
   wherein the QoS Null frame does not include any user data for the responding station,
   wherein the ACK policy field is set to a value indicating that the ACK policy is an immediate ACK response to request a transmission of the ACK frame after a Short Interframe Space (SIFS), and
   wherein the QoS Null frame further includes a Modulation and Coding Scheme Feedback Request (MRQ) field that indicates whether the responding station is requested to send a Modulation and Coding Scheme Feedback (MFB); and
   transmitting, by the responding station, the ACK frame to the requesting station based on the ACK policy,
   wherein only when the MRQ field indicates that the responding station is requested to send the MFB does the ACK frame include a MCS estimate that is estimated by the responding station based on the MU-PPDU.

2. The method of claim 1,
   wherein only one of the plurality of data frames includes the QoS Null frame that corresponds to the responding station and contains the ACK policy for the immediate ACK response.

3. The method of claim 2, wherein remaining data frames of the plurality of data frames do not contain ACK policies for the immediate ACK response.

4. The method of claim 2, wherein the MU-PPDU includes a group identifier indicating the plurality of stations.

5. The method of claim 1, wherein the ACK policy field in the QoS Null frame has two bits.

6. The method of claim 1, wherein the MRQ field is included in a Medium Access Control (MAC) header of the QoS Null frame.

7. The method of claim 1, wherein the MRQ field has a single bit.

8. A device for a wireless local area network, the device comprising:
   a transceiver configured to receive and transmit radio signals; and
   a processor operatively coupled with the transceiver and configured to:
      instruct the transceiver to receive a Multi User-Physical layer Protocol Data Unit (MU-PPDU) from a requesting station, the MU PPDU including a plurality of data frames destined for a plurality of receiving stations including the device,
      wherein one data frame of the plurality of data frames includes a Quality of Service (QoS) Null frame that includes an ACK policy field that identifies an ACK policy for the responding station, and
      wherein the QoS Null frame indicates that the device will firstly send an acknowledgement (ACK) frame among the plurality of receiving stations,
      wherein the QoS Null frame does not include any user data for the device,
      wherein the ACK policy field is set to a value indicating that the ACK policy is an immediate ACK response to request a transmission of the ACK frame after a Short Interframe Space (SIFS), and
      wherein the QoS Null frame further includes a Modulation and Coding Scheme Feedback Request (MRQ) field that indicates whether the device requested to send a Modulation and Coding Scheme Feedback (MFB); and
      instruct the transceiver to transmit the ACK frame to the requesting station based on the ACK policy,
      wherein only when the MRQ field indicates that the device is requested to send the MFB does the ACK frame include a MCS estimate that is estimated by the device based on the MU-PPDU.

9. The device of claim 8,
   wherein only one of the plurality of data frames includes the QoS Null frame that corresponds to the device and contains the ACK policy for the immediate ACK response.

10. The device of claim 9, wherein remaining data frames of the plurality of data frames do not contain ACK policies for the immediate ACK response.

11. The device of claim 9, wherein the MU-PPDU includes a group identifier indicating the plurality of stations.

12. The device of claim 8, wherein the ACK policy field in the QoS Null frame has two bits.

13. The device of claim 8, wherein the MRQ field is included in a Medium Access Control (MAC) header of the QoS Null frame.

14. The device of claim 8, wherein the MRQ field has a single bit.

* * * * *